(12) United States Patent
Hirota et al.

(10) Patent No.: US 12,136,886 B2
(45) Date of Patent: Nov. 5, 2024

(54) POWER CONVERSION DEVICE

(71) Applicant: Panasonic Intellectual Property Management Co., Ltd., Osaka (JP)

(72) Inventors: Shogo Hirota, Osaka (JP); Kenji Hanamura, Osaka (JP); Takashi Shirakawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 291 days.

(21) Appl. No.: 17/636,184

(22) PCT Filed: Jun. 22, 2020

(86) PCT No.: PCT/JP2020/024288
§ 371 (c)(1),
(2) Date: Jul. 28, 2022

(87) PCT Pub. No.: WO2021/053911
PCT Pub. Date: Mar. 25, 2021

(65) Prior Publication Data
US 2022/0360182 A1    Nov. 10, 2022

(30) Foreign Application Priority Data
Sep. 18, 2019    (JP) .................................. 2019-169837

(51) Int. Cl.
*H02M 3/335* (2006.01)
*H02M 1/08* (2006.01)

(52) U.S. Cl.
CPC ......... *H02M 3/33573* (2021.05); *H02M 1/08* (2013.01); *H02M 3/33584* (2013.01); *H02M 3/33592* (2013.01)

(58) Field of Classification Search
CPC ......... H02M 3/33573; H02M 3/33584; H02M 3/33592; H02M 3/33576; H02M 3/3376
See application file for complete search history.

(56) References Cited

U.S. PATENT DOCUMENTS 9,025,345 B2    5/2015    Shimada et al.
9,595,876 B2    3/2017    Nielsen
(Continued)

FOREIGN PATENT DOCUMENTS

| CN | 106487230 A | 3/2017 |
| JP | 2018-166389 A | 10/2018 |
| WO | 2018/179605 A1 | 10/2018 |

OTHER PUBLICATIONS

Extended European Search Report issued in corresponding European Patent Application No. 20865170.3., dated on Sep. 15, 2022.
(Continued)

*Primary Examiner* — Nguyen Tran
(74) *Attorney, Agent, or Firm* — Rimon P.C.

(57) ABSTRACT

For power transfer from a first DC part to a second DC part in a dual active bridge (DAB) converter by stepping up a voltage, the second bridge circuit includes a period in which a secondary winding of an insulated transformer and the second DC part conduct and a period in which ends of the secondary winding of the insulated transformer are short-circuited in the second bridge circuit. A control circuit fixes a phase difference between a first leg a the second leg, variably controls a simultaneous off period of a fifth switching element and a sixth switching element, and variably controls a simultaneous off period of a seventh switching element and an eighth switching element.

10 Claims, 16 Drawing Sheets

(56) References Cited

U.S. PATENT DOCUMENTS

| | | |
|---|---|---|
| 10,693,383 B2 | 6/2020 | Kidera |
| 2012/0300502 A1 | 11/2012 | Shimada et al. |
| 2016/0233776 A1 | 8/2016 | Nielsen |
| 2018/0054136 A1* | 2/2018 | Jimichi ............. H02M 3/33584 |
| 2020/0014307 A1 | 1/2020 | Kidera |
| 2020/0144926 A1* | 5/2020 | Murakami ........ H02M 3/33573 |

OTHER PUBLICATIONS

International Search Report received in PCT/JP2020/024288 on Sep. 24, 2020, with Machine English Translation.

* cited by examiner

POWER CONVERSION DEVICE

CROSS REFERENCE

This application is the U.S. National Phase under 35 U.S.C. § 371 of International Application No. PCT/JP2020/024288, filed on Jun. 22, 2020, which claims priority to Japanese Application No. 2019-169837, filed on Sep. 18, 2019, the entire contents are hereby incorporated by reference.

TECHNICAL FIELD

The present disclosure relates to power converters that convert a DC power into an AC power of a different voltage.

BACKGROUND ART

With the widespread use of photovoltaic power generation systems and power storage systems, there is a demand for small-sized and highly efficient power conditioners. In high-grade power conditioners and electric vehicles, an insulated DC-DC converter capable of bidirectional power transfer and compatible with an extensive voltage range both on the primary side and the secondary side is required. A DC-DC converter that meets these requirements is exemplified by a dual active bridge (DAB) converter (see, for example, patent literature 1).
[Patent Literature 1] JP2018-166389

SUMMARY OF INVENTION

Technical Problem

When a reactor of a commonly-used DAB converter according to the related art is charged from a DC power source on the primary side, the reactor is also charged with energy from a DC load on the secondary side, and a reactive current is produced accordingly. Further, hard switching may occur in the presence of a light load.

The present disclosure addresses the above-described issue, and a purpose thereof is to provide a highly efficient, insulated DC-DC converter.

Solution to Problem

A power converter according to an embodiment of the present disclosure includes: a first bridge circuit including a first leg and a second leg, the first leg including a first switching element and a second switching element connected in series, the second leg including a third switching element and a fourth switching element connected in series, and the first leg and the second leg being connected in parallel to a first DC part; a second bridge circuit including a third leg and a fourth leg, the third leg including a fifth switching element and a sixth switching element connected in series, the fourth leg including a seventh switching element and an eighth switching element connected in series, and the third leg and the fourth leg being connected in parallel to a second DC part; an insulated transformer connected between the first bridge circuit and the second bridge circuit; a control circuit that controls the first switching element—the eighth switching element. Diodes are connected or formed in antiparallel to the first switching element—the eighth switching element, respectively, and, for power transfer from the first DC part to the second DC part by stepping up a voltage, the second bridge circuit includes a period in which a secondary winding of the insulated transformer and the second DC part conduct and a period in which ends of the secondary winding of the insulated transformer are short-circuited in the second bridge circuit. The control circuit fixes a phase difference between the first leg and the second leg, variably controls a simultaneous off period of the fifth switching element and the sixth switching element, and variably controls a simultaneous off period of the seventh switching element and the eighth switching element.

Advantageous Effects of Invention

According to the present disclosure, a highly efficient, insulated DC-DC converter can be realized.

DESCRIPTION OF EMBODIMENTS

Figure 1:
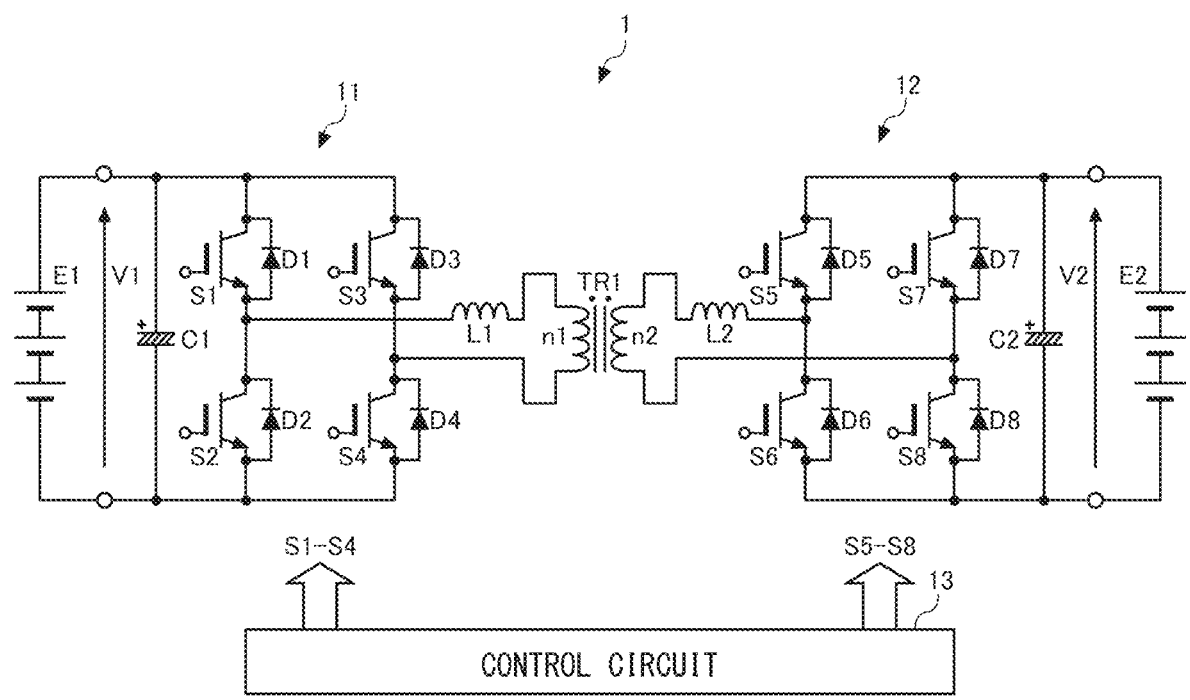
FIG. 1 shows a configuration of a power converter according to an embodiment.

FIG. 1 shows a configuration of a power converter 1 according to an embodiment. The power converter 1 is an insulated bidirectional DC-DC converter (DAB converter) and is configured to convert a DC power supplied from a first DC power source E1 and output a power as converted to a second DC power source E2 or convert a DC power supplied from the second DC power source E2 and output a power as converted to the first DC power source E1. The power converter 1 can transfer power by stepping down the voltage or transfer power by stepping up the voltage.

The first DC power source E1 is embodied by, for example, a storage battery, an electric double layer capacitor, or the like. The second DC power source E2 is embodied by a DC bus to which a bidirectional inverter is connected, or the like. The AC side of the bidirectional inverter is connected to a commercial power system and an AC load in applications of power storage systems. In applications of electric vehicles, it is connected to a motor (provided with a regenerative function). A DC-DC converter for solar cells or a DC-DC converter for other storage cells may further be connected to the DC bus.

The power converter 1 includes a first capacitor C1, a first bridge circuit 11, an insulated transformer TR1, a first leak inductance L1, a second leak inductance L2, a second bridge circuit 12, a second capacitor C2, and a control circuit 13.

The first capacitor C1 is coupled in parallel to the first DC power source E1. The second capacitor C2 is coupled in parallel to the second DC power source E2. For example, an electrolytic capacitor is used for the first capacitor C1 and the second capacitor C2. In this specification, the first DC power source E1 and the first capacitor C1 are collectively referred to as a first DC part, and the second DC power source E2 and the second capacitor C2 are collectively referred to as a second DC part.

The first bridge circuit 11 is a full-bridge circuit configured such that a first leg and a second leg are coupled in parallel. A first switching element S1 and a second switching element S2 are connected in series in the first leg, and a third switching element S3 and a fourth switching element S4 are connected in series in the second leg. The first bridge circuit 11 is coupled in parallel to the first DC part, and a midpoint of the first leg and a midpoint of the second leg are connected to the respective ends of the primary winding n1 of the insulated transformer TR1.

The second bridge circuit 12 is a full-bridge circuit configured such that a third leg and a fourth leg are coupled in parallel. A fifth switching element S5 and a sixth switching element S6 are connected in series in the third leg, and a seventh switching element S7 and an eighth switching element S8 are connected in series in the fourth leg. The second bridge circuit 12 is coupled in parallel to the second DC part, and a midpoint of the third leg and a midpoint of the fourth leg are connected to the respective ends of the secondary winding n2 of the insulated transformer TR1.

First diode D1-eighth diode D8 are connected or formed in antiparallel to the first switching element S1—the eighth switching element S8, respectively. An insulated gate bipolar transistor (IGBT) or a metal-oxide-semiconductor field-effect transistor (MOSFET) may be used as the first switching element S1—the eighth switching element S8. In the case IGBTs are used, the external first diode D1—the eighth diode D8 are connected to the first switching element S1—the eighth switching element S8, respectively. In the case MOSFETs are used, a parasitic diode formed in the direction from the source to the drain can be used as the first diode D1—the eighth diode D8 in the first switching element S1—the eighth switching element S8, respectively.

The insulated transformer TR1 transforms the output voltage of the first bridge circuit 11 connected to the primary winding n1 in accordance with the turn ratio between the primary winding n1 and the secondary winding n2 and outputs the voltage as transformed to the second bridge circuit 12 connected to the secondary winding n2. Further, the insulated transformer TR1 transforms the output voltage of the second bridge circuit 12 connected to the secondary winding n2 in accordance with the turn ratio between the secondary winding n2 and the primary winding n1 and outputs the voltage as converted to the first bridge circuit 11 connected to the primary winding n1.

The first leak inductance L1 is formed between the midpoint of the first leg of the first bridge circuit 11 and one end of the primary winding n1 of the insulated transformer TR1. The second leak inductance L2 is formed between the third leg of the second bridge circuit 12 and one end of the secondary winding n2. A reactor element having a predetermined inductance value may be connected in place of the first leak inductance L1 and the second leak inductance L2.

Although not shown in FIG. 1, a first voltage sensor for detecting a voltage across the first DC part, a first current sensor for detecting a current flowing in the first DC part, a second voltage sensor for detecting a voltage across the second DC part, and a second current sensor for detecting a current flowing in the second DC part are provided, and respective measurement values are output to the control circuit 13.

The control circuit 13 controls the first switching element S1—the eighth switching element S8 by suppling a driving signal (a pulse width modulation (PWM) signal) to the gate terminals of the first switching element S1—the eighth switching element S8. The configuration of the control circuit 13 can be realized by cooperation of hardware resources and software resources or by hardware resources alone. An analog device, microcomputer, DSP, ROM, RAM, FPGA, and other LSIs can be used as hardware resources. Programs such as firmware can be used as software resources.

For power transfer from the first DC part to the second DC part, the control circuit 13 controls the first switching element S1—the eighth switching element S8 so that the output voltage to the second DC part maintains the value designated by a voltage command value, based on the measurement value of the second voltage sensor. Further, for power transfer from the first DC part to the second DC part, the control circuit 13 controls the first switching element S1—the eighth switching element S8 so that the output current to the second DC part maintains the value designated by a current command value, based on the measurement value of the second current sensor. Further, for power transfer from the second DC part to the first DC part, the control circuit 13 controls the first switching element S1—the eighth switching element S8 so that the output voltage to the first DC part maintains the value designated by a voltage command value, based on the measurement value of the first voltage sensor. Further, for power transfer from the second DC part to the first DC part, the control circuit 13 controls the first switching element S1—the eighth switching element S8 so that the output current to the first DC part maintains the value designated by a current command value, based on the measurement value of the first current sensor.

Thus, the DAB converter is symmetrically configured on the primary side and on the secondary side and can transfer power bidirectionally. A description will now be given of the operation of the power converter 1.

Comparative Example 1

FIGS. 2A-2F show an operation of the power converter 1 according to comparative example 1. For simplified illustration, FIGS. 2A-2F depict the insulated transformer TR1, the first leak inductance L1, and the second leak inductance L2 collectively as one reactor L. Further, the first capacitor C1 and the second capacitor C2 are omitted from the illustration.

Figure 2A:
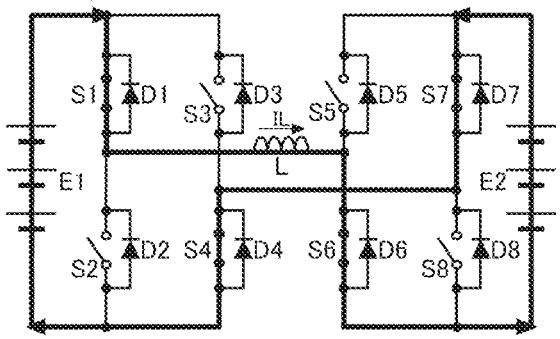
FIGS. 2A-2F show an operation of the power converter according to comparative example 1.

In the first state shown in FIG. 2A, the control circuit 13 controls the first switching element S1, the fourth switching element S4, the sixth switching element S6, and the seventh switching element S7 to be in an on state and controls the second switching element S2, the third switching element S3, the fifth switching element S5, and the eighth switching element S8 to be in an off state. In the first state, the first DC power source E1 and the second DC power source E2 are connected in series with the reactor L, and energy is discharged from both of the first DC power source E1 and the second DC power source E2 to the reactor L so as to charge the reactor L with energy.

Figure 2F:
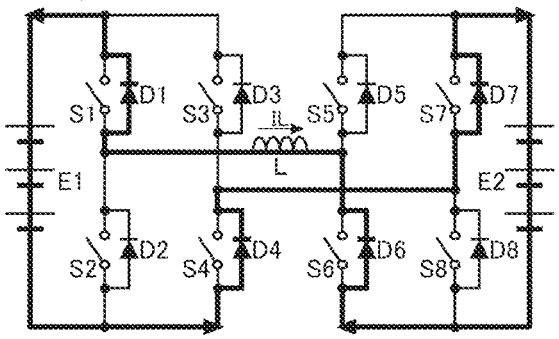
Figure 2B:
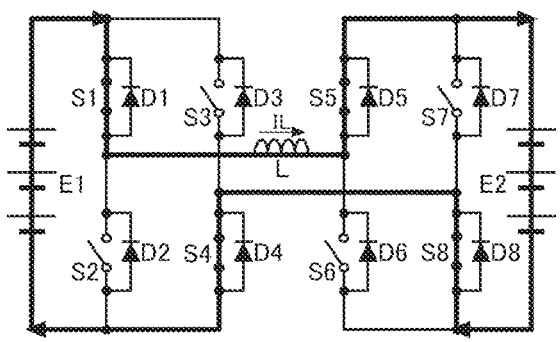

In the second state shown in FIG. 2B, the control circuit 13 controls the first switching element S1, the fourth switching element S4, the fifth switching element S5, and the eighth switching element S8 to be in an on state and controls the second switching element S2, the third switching element S3, the sixth switching element S6, and the seventh switching element S7 to be in an off state. In the second state, energy is discharged from both of the first DC power source E1 and the reactor L to the second DC power source E2 so as to charge the second DC power source E2 with energy.

Figure 2E:
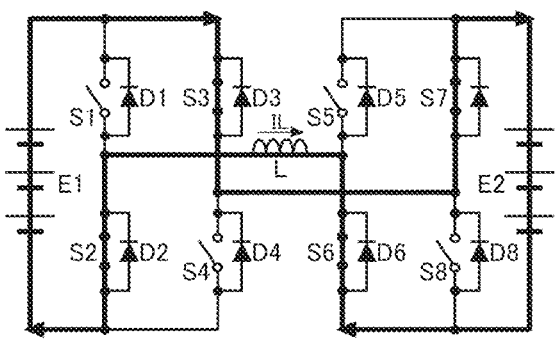
Figure 2C:
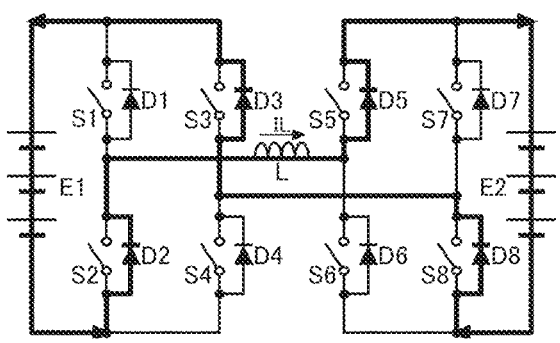

In the third state shown in FIG. 2C, the control circuit 13 controls the first switching element S1—the eighth switching element S8 to be in an off state. The third state is a dead time period, and a return current flows through the second diode D2, the third diode D3, the fifth diode D5, and the eighth diode D8. In the third state, energy is discharged from the reactor L to both of the first DC power source E1 and the second DC power source E2 so as to charge the first DC power source E1 and the second DC power source E2 with energy.

Figure 2D:
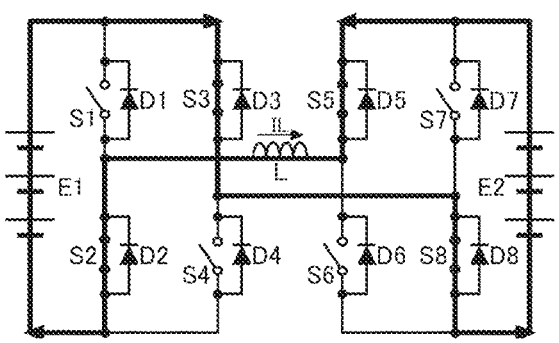

In the fourth state shown in FIG. 2D, the control circuit 13 controls the second switching element S2, the third switching element S3, the fifth switching element S5, and the eighth switching element S8 to be in an on state and controls the first switching element S1, the fourth switching element S4, the sixth switching element S6, and the seventh switching element S7 to be in an off state. In the fourth state, the first DC power source E1 and the second DC power source E2 are connected in series with the reactor L, and energy is discharged from both of the first DC power source E1 and the second DC power source E2 to the reactor L so as to charge the reactor L with energy.

In the fifth state shown in FIG. 2E, the control circuit 13 controls the second switching element S2, the third switching element S3, the sixth switching element S6, and the seventh switching element S7 to be in an on state and controls the first switching element S1, the fourth switching element S4, the fifth switching element S5, and the eighth switching element S8 to be in an off state. In the fifth state, energy is discharged from both of the first DC power source E1 and the reactor L to the second DC power source E2 so as to charge the second DC power source E2 with energy.

In the sixth state shown in FIG. 2F, the control circuit 13 controls the first switching element S1—the eighth switching element S8 to be in an off state. The sixth state is a dead time period, and a return current flows through the first diode D1, the fourth diode D4, the sixth diode D6, and the seventh diode D7. In the sixth state, energy is discharged from the reactor L to both of the first DC power source E1 and the second DC power source E2 so as to charge the first DC power source E1 and the second DC power source E2 with energy.

In comparative example 1, power is transferred from the first DC power source E1 to the second DC power source E2 by repeating the six switching patterns above. In comparative example 1, the voltage or current of the power transferred can be controlled by controlling a phase difference between the switching phase of the first switching element S1—the fourth switching element S4 and the switching phase of the fifth switching element S5—the eighth switching element S8.

Figure 3A:
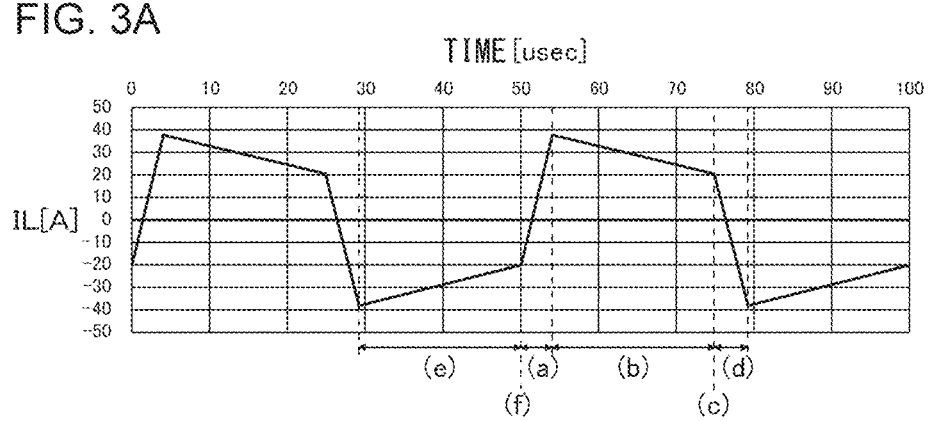
FIGS. 3A-3B show a specific example of a current flowing in the reactor in comparative example 1.
Figure 3B:
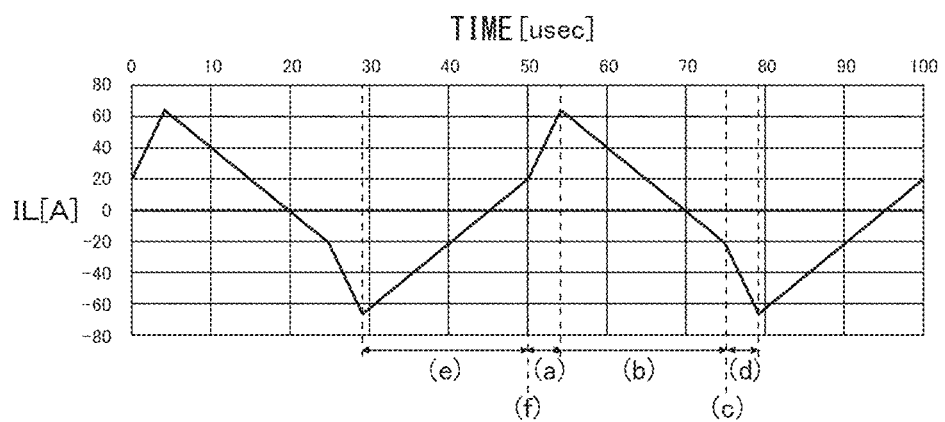

FIGS. 3A-3B show a specific example of a current IL flowing in the reactor L in comparative example 1. FIG. 3A shows a case in which a voltage difference between the first DC power source E1 and the second DC power source E2 is small and shows an example in which the input voltage of the power converter 1 is 400 V and the output voltage is 450 V. FIG. 3B shows a case in which a voltage difference between the first DC power source E1 and the second DC power source E2 is large and shows an example in which the input voltage of the power converter 1 is 200 V and the output voltage is 450 V. In both examples, the voltage of the first DC power source E1 is stepped up, and the first DC power source E1 charges the second DC power source E2.

In the state 1 (a) and the state 4 (d), the current IL flows from both of the first DC power source E1 and the second DC power source E2 to the reactor L so that a reactive component is produced. The second DC power source E2 is the destination of power supply so that the energy discharged from the second DC power source E2 will return to the second DC power source E2 afterwards. Therefore, a reactive current flows in the reactor L from the second DC power source E2 in the state 1 (a) and the state 4 (d).

In the example shown in FIG. 3B, the direction of the reactor current IL is switched in middle of the state 2 (b) and in the middle of the state 5 (e). Switching of the positive or negative sign of the reactor current IL in the middle reverses the direction of charging/discharging the parasitic capacitance of the switching element, and hard switching occurs accordingly. After the sign of the reactor current IL is switched, the direction of power transfer will also be reversed, and a reactive current is produced accordingly. The state shown in FIG. 3B also occurs when the destination of power transfer is a light load.

Comparative Example 2

FIGS. 4A-4F show an operation of the power converter 1 according to comparative example 2.

Figure 4A:
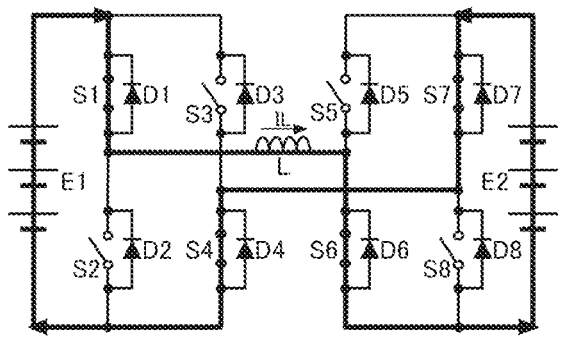
FIGS. 4A-4F show an operation of the power converter according to comparative example 2.

In the first state shown in FIG. 4A, the control circuit 13 controls the first switching element S1, the fourth switching element S4, the sixth switching element S6, and the seventh switching element S7 to be in an on state and controls the second switching element S2, the third switching element S3, the fifth switching element S5, and the eighth switching element S8 to be in an off state. In the first state, the first DC power source E1 and the second DC power source E2 are connected in series with the reactor L, and energy is discharged from both of the first DC power source E1 and the second DC power source E2 to the reactor L so as to charge the reactor L with energy.

Figure 4F:
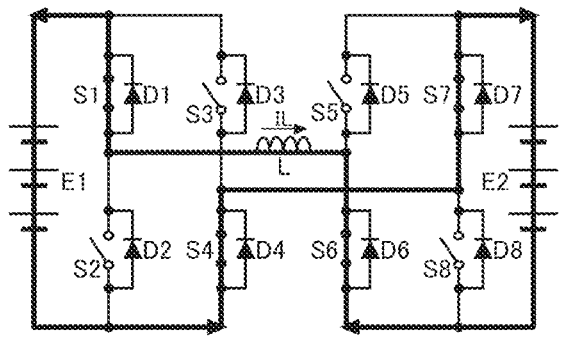
Figure 4B:
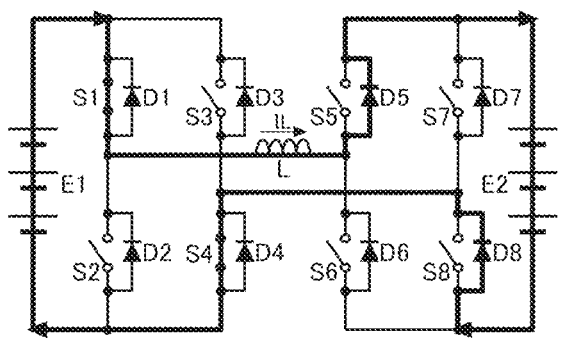

In the second state shown in FIG. 4B, the control circuit 13 controls the first switching element S1 and the fourth switching element S4 to be in an on state and controls the second switching element S2, the third switching element S3, and the fifth switching element S5—the eighth switching element S8 to be in an off state. Since all of the fifth switching element S5—the eighth switching element S8 are in an off state, the second bridge circuit 12 is configured as a diode bridge circuit and functions as a rectifier circuit. In the second state, energy is discharged from both of the first DC power source E1 and the reactor L to the second DC power source E2 so as to charge the second DC power source E2 with energy. Since the second bridge circuit 12 functions as a rectifier circuit, the direction of the reactor current IL will not be switched.

Figure 4E:
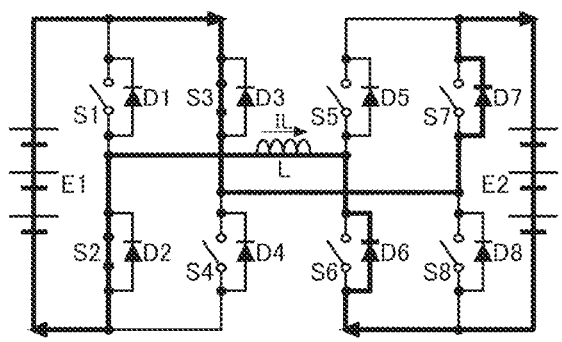
Figure 4C:
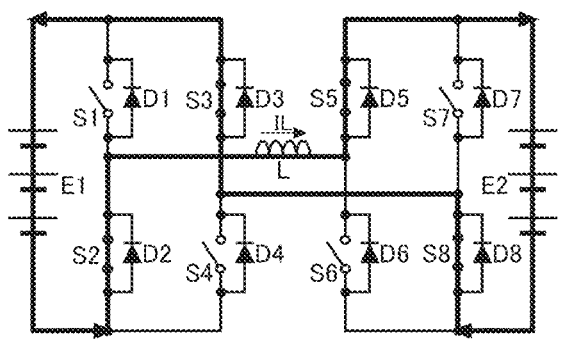
Figure 4D:
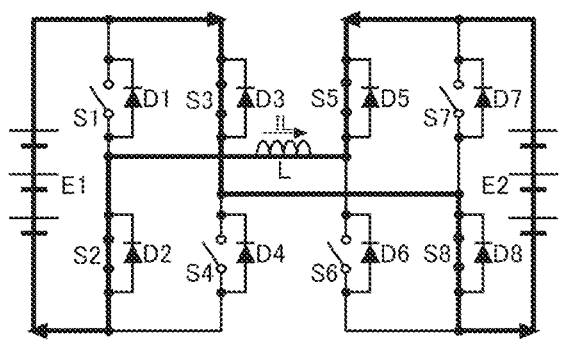

In the third state shown in FIG. 4C and the fourth state shown in FIG. 4D, the control circuit 13 controls the second switching element S2, the third switching element S3, the fifth switching element S5, and the eighth switching element S8 to be in an on state and controls the first switching element S1, the fourth switching element S4, the sixth switching element S6, and the seventh switching element S7 to be in an off state. In the third state, energy is discharged from the reactor L to both of the first DC power source E1 and the second DC power source E2 so as to charge the first DC power source E1 and the second DC power source E2 with energy. In the fourth state, the first DC power source E1 and the second DC power source E2 are connected in series with the reactor L, and energy is discharged from both of the first DC power source E1 and the second DC power source E2 to the reactor L so as to charge the reactor L with energy. When the reactor current IL goes to 0 A before a transition is made to the switching patterns shown in FIG. 4C and FIG. 4D, a transition is not made from the state 2 to the state 3, and a transition is directly made from the state 2 to the state 4.

In the fifth state shown in FIG. 4E, the control circuit 13 controls the second switching element S2 and the third switching element S3 to be in an on state and controls the first switching element S1, the fourth switching element S4, the fifth switching element S5—the eighth switching element S8 to be in an off state. Since all of the fifth switching element S5—the eighth switching element S8 are in an off state, the second bridge circuit 12 is configured as a diode bridge circuit and functions as a rectifier circuit. In the fifth state, energy is discharged from both of the first DC power source E1 and the reactor L to the second DC power source E2 so as to charge the second DC power source E2 with energy. Since the second bridge circuit 12 functions as a rectifier circuit, the direction of the reactor current IL will not be switched.

In the sixth state shown in FIG. 4F and the first state shown in FIG. 4A, the control circuit 13 controls the first switching element S1, the fourth switching element S4, the sixth switching element S6, and the seventh switching element S7 to be in an on state and controls the second switching element S2, the third switching element S3, the fifth switching element S5, and the eighth switching element S8 to be in an off state. In the sixth state, energy is discharged from the reactor L to both of the first DC power source E1 and the second DC power source E2 so as to charge the first DC power source E1 and the second DC power source E2 with energy. When the reactor current IL goes to 0 A before a transition is made to the switching patterns shown in FIG. 4F and FIG. 4A, a transition is not made from the state 5 to the state 6, and a transition is directly made from the state 5 to the state 1.

In comparative example 2, power is transferred from the first DC power source E1 to the second DC power source E2 by repeating the four switching patterns above. In comparative example 2, the voltage or current of the power transferred can be controlled by controlling the duty ratio (on period) of the fifth switching element S5—the eighth switching element S8. In comparative example 2, the step-up operation and the step-down operation can be switched to one another only by controlling the duty ratio (on period) of the fifth switching element S5—the eighth switching element S8. Also, power can be transferred bidirectionally irrespective of the relative magnitude of the voltages of the first DC part and the second DC part.

Figure 5:
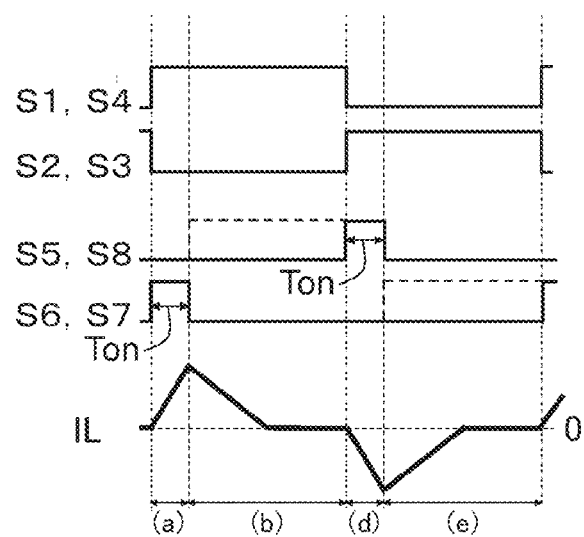
FIG. 5 show a specific example of the current flowing in the reactor in comparative example 2.

FIG. 5 show a specific example of the current IL flowing in the reactor L in comparative example 2. In the example shown in FIG. 5, the reactor current IL goes to 0 A in the middle of the state 2 (b) so that a transition is directly made from the state 2 (b) to the state 4 (d), bypassing the state 3 (c). Similarly, the reactor current IL goes to 0 A in the middle of the state 5 (e) so that a transition is directly made from the state 5 (e) to the state 1 (a), bypassing the state 6 (f).

In comparative example 2, the sign of the reactor current IL will not be switched as shown in FIG. 3B during a period of power transmission in the state 2 (b) and in the state 5 (e). This can prevent the occurrence of hard switching and reduce loss from hard switching. However, a reactive current is produced, as in the case of comparative example, 1, during the charging period in the state 1 (a) and in the state 4 (d).

(Embodiment 1 (Step-Down Mode))

FIGS. 6A-6F show an operation of the power converter 1 according to embodiment 1 (step-down mode).

Figure 6A:
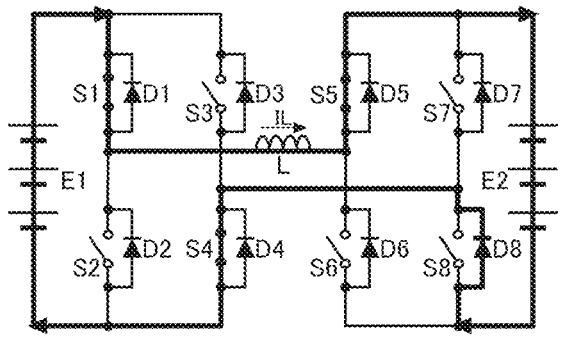
FIGS. 6A-6F show an operation of the power converter according to embodiment 1 (step-down mode)

In the first state shown in FIG. 6A, the control circuit 13 controls the first switching element S1, the fourth switching element S4, and the fifth switching element S5 to be in an on state and controls the second switching element S2, the third switching element S3, the sixth switching element S6, the seventh switching element S7, and the eighth switching element S8 to be in an off state. In the first state, energy is discharged from the first DC power source E1 to both of the reactor L and the second DC power source E2 so as to charge the reactor L and the second DC power source E2 with energy.

Figure 6F:
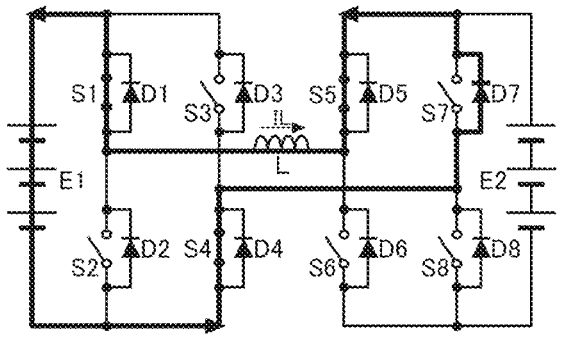
Figure 6B:
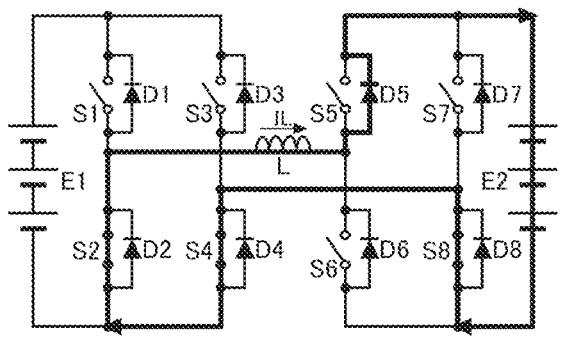

In the second state shown in FIG. 6B, the control circuit 13 controls the second switching element S2, the fourth switching element S4, and the eighth switching element S8 to be in an on state and controls the first switching element S1, the third switching element S3, the fifth switching element S5, the sixth switching element S6, and the seventh switching element S7 to be in an off state. In the second state, the ends of the primary winding n1 of the insulated transformer TR1 are short-circuited in the first bridge circuit 11, and the reactor L is electrically cut off from the first DC power source E1. In the second state, energy is discharged from the reactor L to the second DC power source E2 so as to charge the second DC power source E2 with energy. The eighth switching element S8 is turned on for synchronous rectification. Synchronous rectification is useful when MOSFETs are used as the switching elements. Even if the eighth switching element S8 is used for synchronous rectification, the direction of the reactor current IL is not reversed because the fifth switching element S5 is in an off state.

Figure 6E:
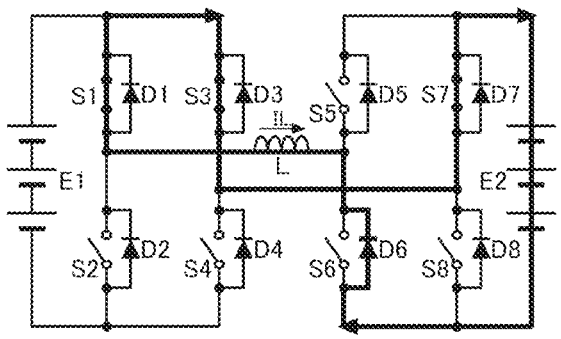
Figure 6C:
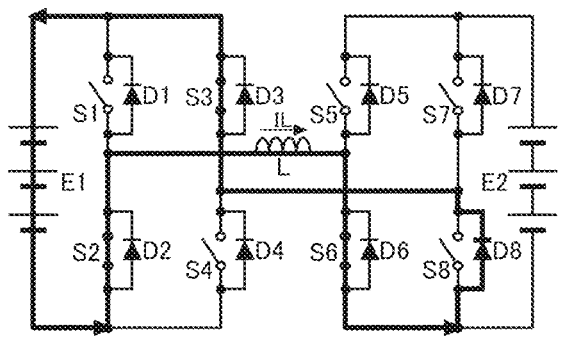
Figure 6D:
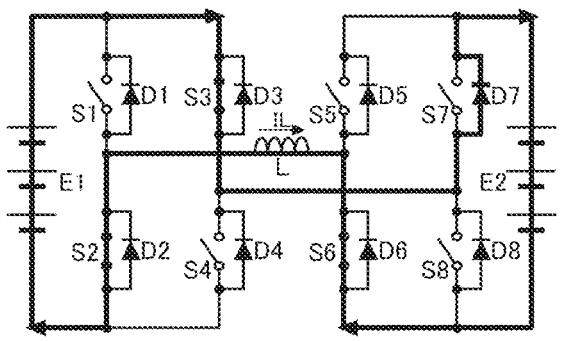

In the third state shown in FIG. 6C and in the fourth state shown in FIG. 6D, the control circuit 13 controls the second switching element S2, the third switching element S3, and the sixth switching element S6 to be in an on state and controls the first switching element S1, the fourth switching element S4, the fifth switching element S5, the seventh switching element S7, and the eighth switching element S8 to be in an off state. In the third state, energy is discharged from the reactor L to the first DC power source E1 so as to charge the first DC power source E1 with energy. In the fourth state, energy is discharged from the first DC power source E1 to both of the reactor L and the second DC power source E2 so as to charge the reactor L and the second DC power source E2 with energy. When the reactor current IL goes to 0 A before a transition is made to the switching patterns shown in FIG. 6C and FIG. 6D, a transition is not made from the state 2 to the state 3, and a transition is directly made from the state 2 to the state 4.

In the fifth state shown in FIG. 6E, the control circuit 13 controls the first switching element S1, the third switching element S3, and the seventh switching element S7 to be in an on state and controls the second switching element S2, the fourth switching element S4, the fifth switching element S5, the sixth switching element S6, and the eighth switching element S8 to be in an off state. In the fifth state, the ends of the primary winding n1 of the insulated transformer TR1 are short-circuited in the first bridge circuit 11, and the reactor L is electrically cut off from the first DC power source E1. In the fifth state, energy is discharged from the reactor L to the second DC power source E2 so as to charge the second DC power source E2 with energy. The seventh switching element S7 is turned on for synchronous rectification. Even if the seventh switching element S7 is used for synchronous rectification, the direction of the reactor current IL is not reversed because the sixth switching element S6 is in an off state.

In the sixth state shown in FIG. 6F and the first state shown in FIG. 6A, the control circuit 13 controls the first switching element S1, the fourth switching element S4, and the fifth switching element S5 to be in an on state and controls the second switching element S2, the third switching element S3, the sixth switching element S6, the seventh switching element S7, and the eighth switching element S8 to be in an off state. In the sixth state, energy is discharged from the reactor L to the first DC power source E1 so as to charge the first DC power source E1 with energy. When the reactor current IL goes to 0 A before a transition is made to the switching patterns shown in FIG. 6F and FIG. 6A, a transition is not made from the state 5 to the state 6, and a transition is directly made from the state 5 to the state 1.

In embodiment 1 (step-down mode), power is transferred from the first DC power source E1 to the second DC power source E2 by stepping down the voltage by repeating the four switching patterns above. In embodiment 1 (step-down mode), the voltage or current of the power supplied from the first DC part to the second DC part is controlled by controlling a phase difference 0 between the first leg (the first switching element S1 and the second switching element S2) and the second leg (the third switching element S3 and the fourth switching element S4) on the primary side. The duty ratio of the first switching element S1—the fourth switching element S4 is fixed at 50%.

Figure 7:
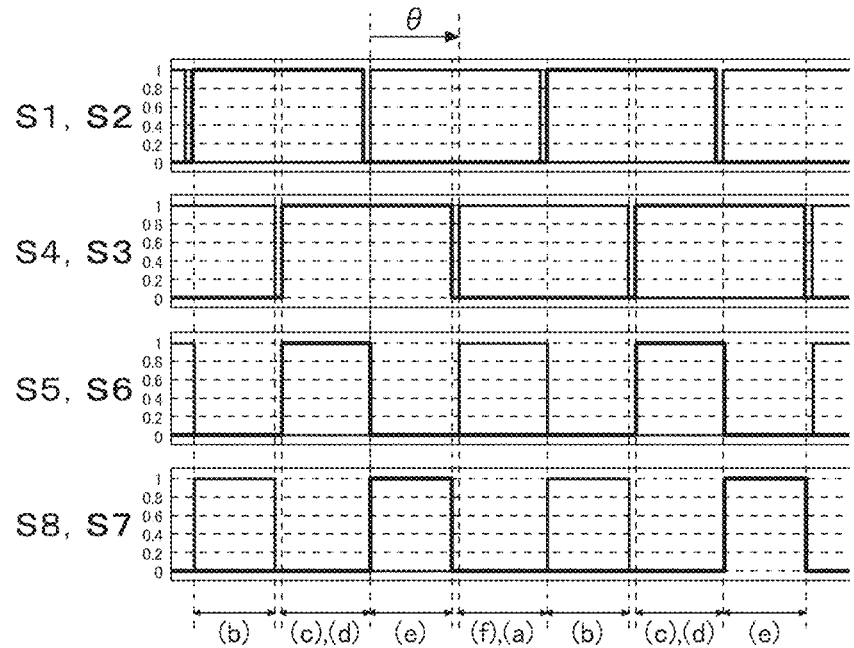
FIG. 7 shows a switching timing 1 of the first switching element S1—the eighth switching element S8 according to embodiment 1 (step-down mode)

FIG. 7 shows a switching timing 1 of the first switching element S1—the eighth switching element S8 according to embodiment 1 (step-down mode). Thin lines show on/off states of the first switching element S1, the fourth switching element S4, the fifth switching element S5, and the eighth switching element S8. Bold lines show on/off states of the second switching element S2, the third switching element S3, the sixth switching element S6, and the seventh switching element S7.

The first switching element S1 and the second switching element S2 operate in a complementary manner. A dead time is inserted at a point of time when the on/off of the elements is switched. A dead time is a time inserted to prevent the first switching element S1 and the second switching element S2 from conducting at the same time to short-circuit the ends of the first DC power source E1. Similarly, the third switching element S3 and the fourth switching element S4 operate in a complementary manner. A dead time is inserted at a point of time when the on/off of the elements is switched. The step-down rate is determined according to the phase difference 0 between the first switching element S1/the second switching element S2 and the fourth switching element S4/the third switching element S3.

In the example shown in FIGS. 6A-6F and FIG. 7, the fifth switching element S5 is controlled to be in an on state in the state 6 (f) and the state 1 (a), and the eighth switching element S8 is controlled to be in an on state in the state 2 (b). Alternatively, the eighth switching element S8 may be controlled to be in an on state in the state 6 (f) and the state 1 (a), and the fifth switching element S5 may be controlled to be in an on state in the state 2 (b). Similarly, the sixth switching element S6 is controlled to be in an on state in the state 3 (c) and the state 4 (d), and the seventh switching element S7 is controlled to be in an on state in the state 5 (e). Alternatively, the seventh switching element S7 may be controlled to be in an on state in the state 3 (c) and the state 4 (d), and the sixth switching element S6 may be controlled to be in an on state in the state 5 (e).

Figure 8:
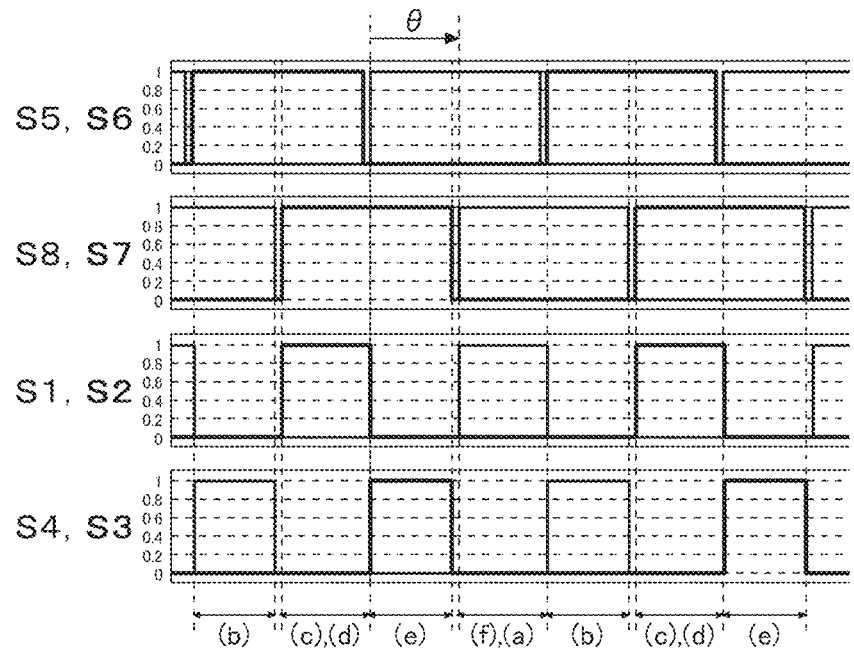
FIG. 8 shows a switching timing 2 of the first switching element S1—the eighth switching element S8 according to embodiment 1 (step-down mode)

FIG. 8 shows a switching timing 2 of the first switching element S1—the eighth switching element S8 according to embodiment 1 (step-down mode). In the example shown in FIGS. 6A-6F and FIG. 7, it is described that power is supplied from the first DC part to the second DC part by stepping down the voltage. Alternatively, power may be supplied from the second DC part to the first DC part by stepping down the voltage. In this case, as shown in FIG. 8, the control circuit 13 may switch the driving signal supplied to the first switching element S1—the fourth switching element S4 and the driving signal supplied to the fifth switching element S5—the eighth switching element S8.

As described above, embodiment 1 (step-down mode) can reduce reactive power and improve the conversion efficiency because it does not create a state in which power is transferred from the second DC power source E2 to the reactor L. In contrast, power is transferred from the second DC power source E2 to the reactor L in the states shown in FIGS. 2A, FIG. 2D according to comparative example 1 and in FIGS. 4A, FIG. 4D according to comparative example 2. This produces reactive power and conduction loss. According to embodiment 1 (step-down mode), the conduction loss can be reduced.

Further, synchronous rectification on the secondary side in the state 2 (b) and the state 5 (e) can reduce conduction loss of the diode. By using one switching element for synchronous rectification in the state 2 (b) and the state 5 (e), the direction of the reactor current IL is prevented from being reversed, and, at the same time, loss can be reduced. This can also prevent the occurrence of hard switching. By providing a short-circuit mode on the primary side, it is possible to adjust power according to a phase shift.

(Embodiment 2 (Step-Down Mode))

FIGS. 9A-9E show an operation 1 of the power converter 1 according to embodiment 2 (step-down mode). FIGS. 10A-10E show an operation 2 of the power converter 1 according to embodiment 2 (step-down mode). Embodiment 2 (step-down mode) is based on embodiment 1 (step-down mode) but is configured to make transitions in finer steps.

Figure 9A:
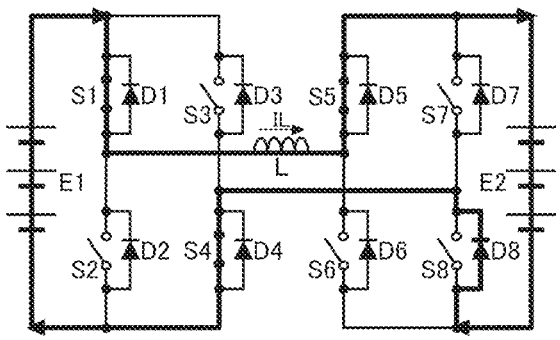
FIGS. 9A-9E show an operation 1 of the power converter according to embodiment 2 (step-down mode)

In the first state shown in FIG. 9A, the control circuit 13 controls the first switching element S1, the fourth switching element S4, and the fifth switching element S5 to be in an on state and controls the second switching element S2, the third switching element S3, the sixth switching element S6, the seventh switching element S7, and the eighth switching element S8 to be in an off state. In the first state, energy is discharged from the first DC power source E1 to both of the reactor L and the second DC power source E2 so as to charge the reactor L and the second DC power source E2 with energy. This state corresponds to the first state in embodiment 1 (step-down mode) shown in FIG. 6A.

Figure 9D:
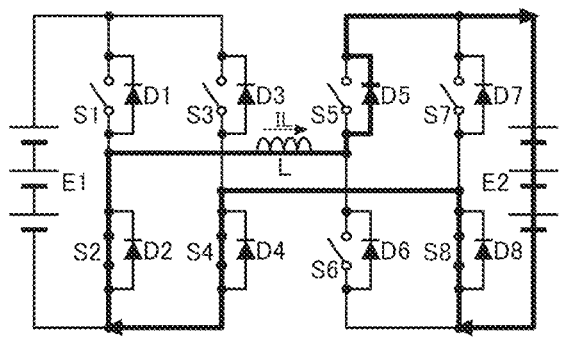
Figure 9B:
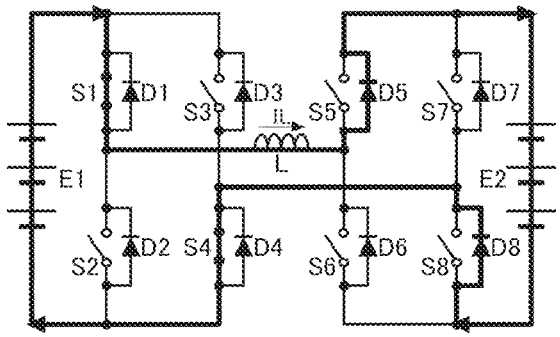

In the second state shown in FIG. 9B, the control circuit 13 controls the first switching element S1 and the fourth switching element S4 to be in an on state and controls the second switching element S2, the third switching element S3, the fifth switching element S5, the sixth switching element S6, the seventh switching element S7, and the eighth switching element S8 to be in an off state. In the second state, too, energy is discharged from the first DC power source E1 to both of the reactor L and the second DC power source E2 so as to charge the reactor L and the second DC power source E2 with energy.

Figure 9E:
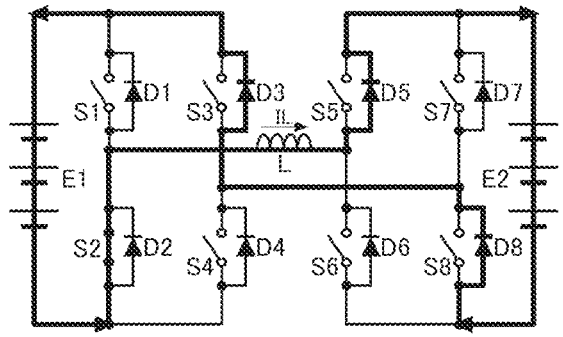
Figure 9C:
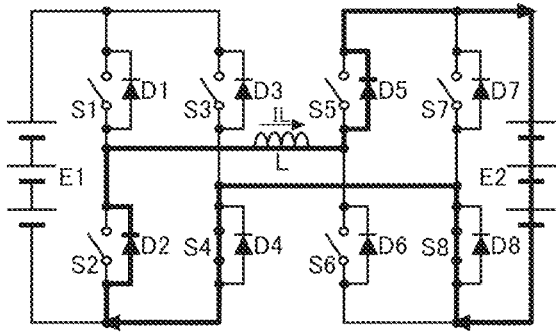

In the third state shown in FIG. 9C, the control circuit 13 controls the fourth switching element S4 and the eighth switching element S8 to be in an on state and controls the first switching element S1, the second switching element S2, the third switching element S3, the fifth switching element S5, the sixth switching element S6, and the seventh switching element S7 to be in an off state. In the third state, the ends of the primary winding n1 of the insulated transformer TR1 are short-circuited in the first bridge circuit 11, and the reactor L is electrically cut off from the first DC power source E1. In the third state, energy is discharged from the reactor L to the second DC power source E2 so as to charge the second DC power source E2 with energy. The eighth switching element S8 is turned on for synchronous rectification.

In the fourth state shown in FIG. 9D, the control circuit 13 controls the second switching element S2, the fourth switching element S4, and the eighth switching element S8 to be in an on state and controls the first switching element S1, the third switching element S3, the fifth switching element S5, the sixth switching element S6, and the seventh switching element S7 to be in an off state. In the fourth state, too, the ends of the primary winding n1 of the insulated transformer TR1 are short-circuited in the first bridge circuit 11, and the reactor L is electrically cut off from the first DC power source E1. In the fourth state, too, energy is discharged from the reactor L to the second DC power source E2 so as to charge the second DC power source E2 with energy. The eighth switching element S8 is turned on for synchronous rectification. This state corresponds to the second state of embodiment 1 (step-down mode) shown in FIG. 6B.

In the fifth state shown in FIG. 9E, the control circuit 13 controls the second switching element S2 to be in an on state and controls the first switching element S1, the third switching element S3, the fourth switching element S4, the fifth switching element S5, the sixth switching element S6, the seventh switching element S7, and the eighth switching element S8 to be in an off state. In the fifth state, energy is discharged from the reactor L to both of the first DC power source E1 and the second DC power source E2 so as to charge the first DC power source E1 and the second DC power source E2 with energy.

Figure 10A:
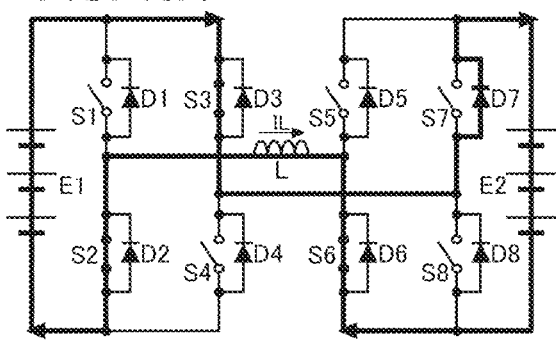
FIGS. 10A-10E show an operation 2 of the power converter according to embodiment 2 (step-down mode)

In the sixth state shown in FIG. 10A, the control circuit 13 controls the second switching element S2, the third switching element S3, and the sixth switching element S6 to be in an on state and controls the first switching element S1, the fourth switching element S4, the fifth switching element S5, the seventh switching element S7, and the eighth switching element S8 to be in an off state. In the sixth state, energy is discharged from the first DC power source E1 to both of the reactor L and the second DC power source E2 so as to charge the reactor L and the second DC power source E2 with energy. This state corresponds to the fourth state of embodiment 1 (step-down mode) shown in FIG. 6D.

Figure 10D:
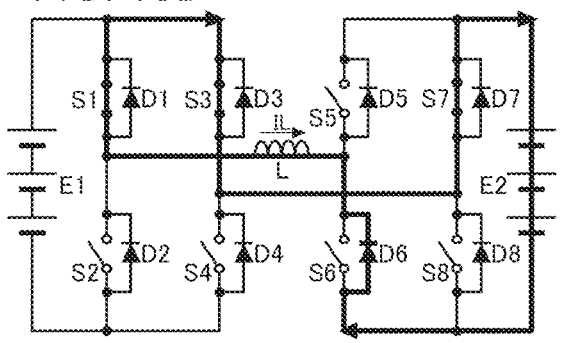
Figure 10B:
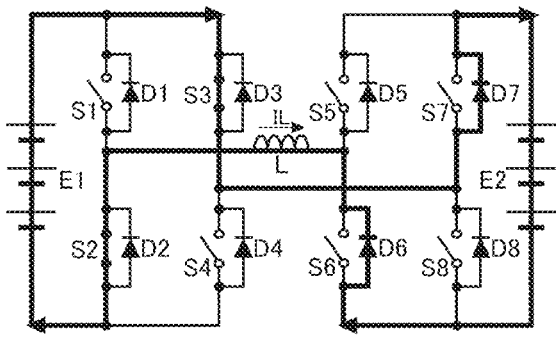

In the seventh state shown in FIG. 10B, the control circuit 13 controls the second switching element S2 and the third switching element S3 to be in an on state and controls the first switching element S1, the fourth switching element S4, the fifth switching element S5, the sixth switching element S6, the seventh switching element S7, and the eighth switching element S8 to be in an off state. In the seventh state, too, energy is discharged from both of the first DC power source E1 and the reactor L to the second DC power source E2 so as to charge the second DC power source E2 with energy.

Figure 10E:
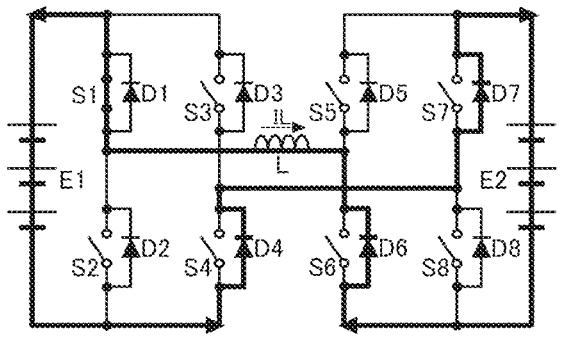
Figure 10C:
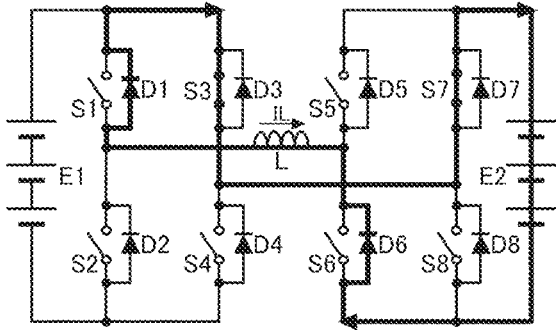

In the eighth state shown in FIG. 10C, the control circuit 13 controls the third switching element S3 and the seventh switching element S7 to be in an on state and controls the first switching element S1, second switching element S2, the fourth switching element S4, the fifth switching element S5, the sixth switching element S6, and the eighth switching element S8 to be in an off state. In the eighth state, the ends of the primary winding n1 of the insulated transformer TR1 are short-circuited in the first bridge circuit 11, and the reactor L is electrically cut off from the first DC power source E1. In the eighth state, energy is discharged from the reactor L to the second DC power source E2 so as to charge the second DC power source E2 with energy. The seventh switching element S7 is turned on for synchronous rectification.

In the ninth state shown in FIG. 10D, the control circuit 13 controls the first switching element S1, the third switching element S3, and the seventh switching element S7 to be in an on state and controls the second switching element S2, the fourth switching element S4, the fifth switching element S5, the sixth switching element S6, and the eighth switching element S8 to be in an off state. In the ninth state, too, the ends of the primary winding n1 of the insulated transformer TR1 are short-circuited in the first bridge circuit 11, and the reactor L is electrically cut off from the first DC power source E1. In the ninth state, too, energy is discharged from the reactor L to the second DC power source E2 so as to charge the second DC power source E2 with energy. The seventh switching element S7 is turned on for synchronous rectification. This state corresponds to the fifth state of embodiment 1 (step-down mode) shown in FIG. 6E.

In the tenth state shown in FIG. 10E, the control circuit 13 controls the first switching element S1 to be in an on state and controls the second switching element S2, the third switching element S3, the fourth switching element S4, the fifth switching element S5, the sixth switching element S6, the seventh switching element S7, and the eighth switching element S8 to be in an off state. In the tenth state, energy is discharged from the reactor L to both of the first DC power source E1 and the second DC power source E2 so as to charge the first DC power source E1 and the second DC power source E2 with energy.

In embodiment 2 (step-down mode), power is transferred from the first DC power source E1 to the second DC power source E2 by stepping down the voltage by repeating the ten switching patterns above. In embodiment 2 (step-down mode), the voltage or current of the power supplied from the first DC part to the second DC part is controlled according to the phase difference θ between the first leg and the second leg on the primary side. The duty ratio of the first switching element S1—the fourth switching element S4 is fixed at 50%. 50% is a value that does not allow for a dead time.

Figure 11:
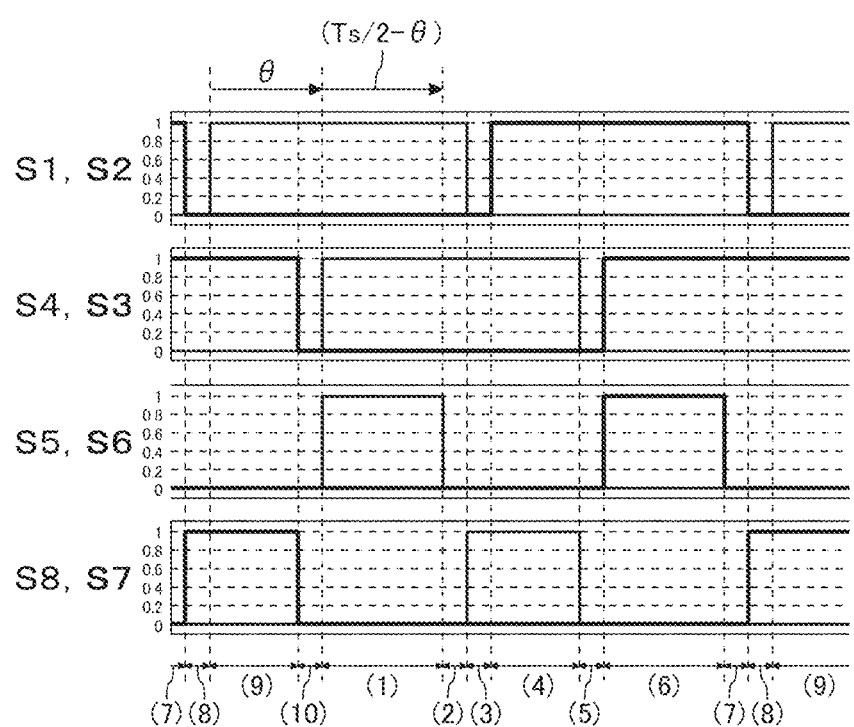
FIG. 11 shows a switching timing of the first switching element S1—the eighth switching element S8 according to embodiment 2 (step-down mode)

FIG. 11 shows a switching timing of the first switching element S1—the eighth switching element S8 according to embodiment 2 (step-down mode). Thin lines show on/off states of the first switching element S1, the fourth switching element S4, the fifth switching element S5, and the eighth switching element S8. Bold lines show on/off states of the second switching element S2, the third switching element S3, the sixth switching element S6, and the seventh switching element S7.

The first switching element S1 and the second switching element S2 operate in a complementary manner. A dead time is inserted at a point of time when the on/off of the elements is switched. Similarly, the third switching element S3 and the fourth switching element S4 operate in a complementary manner. A dead time is inserted at a point of time when the on/off of the elements is switched. The step-down rate is determined according to the phase difference e between the first switching element S1/the second switching element S2 and the fourth switching element S4/the third switching element S3.

The on period of the eighth switching element S8 and the seventh switching element S7 is controlled to be equal to the amount of shift corresponding to the phase difference 0. The rising phase of the eighth switching element S8 and the seventh switching element S7 is fixed, and the falling phase thereof is variable.

The rising phase of the eighth switching element S8 is controlled to be synchronized with the falling phase of the first switching element S1. More specifically, the eighth switching element S8 is turned on at the same time as the first switching element S1 is turned off. The rising phase of the seventh switching element S7 is controlled to be synchronized with the falling phase of the second switching element S2. More specifically, the seventh switching element S7 is turned on at the same time as the second switching element S2 is turned off. This facilitates zero voltage switching (ZVS) of the eighth switching element S8 or the seventh switching element S7.

The falling phase of the eighth switching element S8 is controlled to be synchronized with the falling phase of the fourth switching element S4. More specifically, the eighth switching element S8 is turned off at the same time as the fourth switching element S4. By causing the eighth switching element S8 to be turned off earlier than the rising phase of the sixth switching element S6 by a dead time, a return current loop is prevented from being formed on the secondary side as a result of the eighth switching element S8 and the sixth switching element S6 being turned on at the same time. The falling phase of the seventh switching element S7 is controlled to be synchronized with the falling phase of the third switching element S3. More specifically, the seventh switching element S7 is turned off at the same time as the third switching element S3. By causing the seventh switching element S7 to be turned off earlier than the rising phase of the fifth switching element S5 by a dead time, a return current loop is prevented from being formed on the secondary side as a result of the seventh switching element S7 and the fifth switching element S5 being turned on at the same time.

The on period of the fifth switching element S5 and the sixth switching element S6 is controlled to be of an amount derived from subtracting an amount of shift corresponding to the phase difference 0 from the half cycle (Ts/2) of the unit period on the primary side. The rising phase of the fifth switching element S5 and the sixth switching element S6 is variable, and the falling phase thereof is fixed.

The rising phase of the fifth switching element S5 is controlled to be delayed from the rising phase of the first switching element S1 by a dead time or later. More specifically, the fifth switching element S5 is turned on when a dead time elapses since the turn-on of the first switching element S1 or later. The rising phase of the sixth switching element S6 is controlled to be delayed from the rising phase of the second switching element S2 by a dead time or later. More specifically, the sixth switching element S6 is turned on when a dead time elapses since the turn-on of the second switching element S2 or later. This can reduce the occurrence of recovery loss.

The earliest rising phase of the fifth switching element S5 is delayed from the rising phase of the first switching element S1 by a dead time. The fifth switching element S5 does not rise earlier. Similarly, the earliest rising phase of the sixth switching element S6 is delayed from the rising phase of the second switching element S2 by a dead time. The sixth switching element S6 does not rise earlier.

The falling phase of the fifth switching element S5 is controlled to be earlier than the falling phase of the first switching element S1 by a dead time. More specifically, the fifth switching element S5 is turned off earlier than the turn-off of the first switching element S1 by a dead time. This can reduce the occurrence of a reactive current from the secondary side due to the simultaneous turn-on of the fifth switching element S5 and the eighth switching element S8. The falling phase of the sixth switching element S6 is controlled to be earlier than the falling phase of the second switching element S2 by a dead time. More specifically, the sixth switching element S6 is turned off earlier than the turn-off of the second switching element S2 by a dead time. This can reduce the occurrence of a reactive current from the secondary side due to the simultaneous turn-on of the sixth switching element S6 and the seventh switching element S7.

The phase difference 0 between the first leg and the second leg on the primary side is controlled within a range of 0 to 180°. The smaller the phase difference 0, the larger the electrical energy transferred can be. Given that the dead time is fixed, loss incurred in high-frequency operation can be reduced by configuring the minimum value of the phase difference 0 to be 0.

As in embodiment 1 (step-down mode), control of the fifth switching element S5 and control of the eighth switching element S8 may be switched, and control of the sixth switching element S6 and control of the seventh switching element S7 may be switched in embodiment 2 (step-down mode). It is also possible to supply power from the second DC part to the first DC part by stepping down the voltage in embodiment 2 (step-down mode), too, by switching the driving signal supplied to the first switching element S1—the fourth switching element S4 and the driving signal supplied to the fifth switching element S5—the eighth switching element S8.

As described above, embodiment 2 (step-down mode) provides the same advantage as embodiment 1 (step-down mode). By performing finer control than embodiment 1 (step-down mode), the efficiency can be further increased.

(Embodiment 1 (Step-Up Mode))

FIGS. 12A-12F show an operation of the power converter 1 according to embodiment 1 (step-up mode).

Figure 12A:
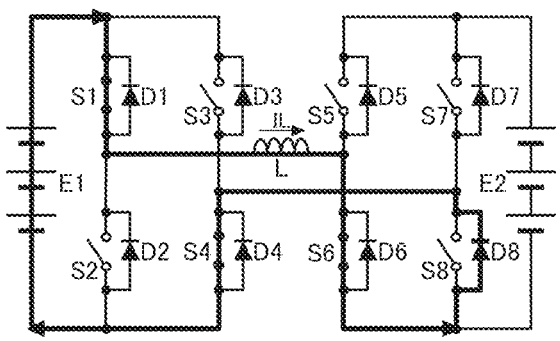
FIGS. 12A-12F show an operation of the power converter according to embodiment 1 (step-up mode)

In the first state shown in FIG. 12A, the control circuit 13 controls the first switching element S1, the fourth switching element S4, and the sixth switching element S6 to be in an on state and controls the second switching element S2, the third switching element S3, the fifth switching element S5, the seventh switching element S7, and the eighth switching element S8 to be in an off state. In the first state, the ends of the secondary winding n2 of the insulated transformer TR1 are short-circuited in the second bridge circuit 12, and the reactor L is electrically cut off from the second DC power source E2. In the first state, energy is discharged from the first DC power source E1 to the reactor L so as to charge the reactor L with energy.

Figure 12F:
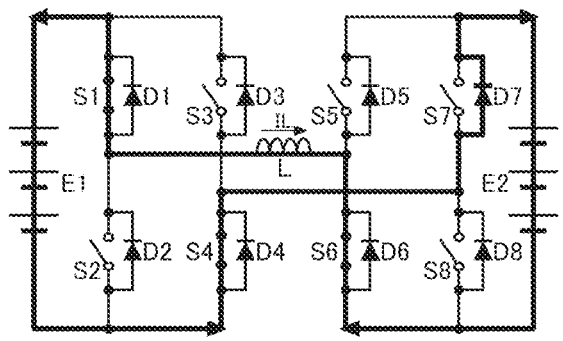
Figure 12B:
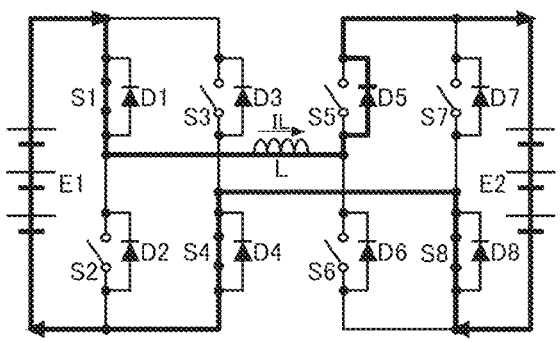

In the second state shown in FIG. 12B, the control circuit 13 controls the first switching element S1, the fourth switching element S4, and the eighth switching element S8 to be in an on state and controls the second switching element S2, the third switching element S3, the fifth switching element S5, the sixth switching element S6, and the seventh switching element S7 to be in an off state. In the second state, energy is discharged from both of the first DC power source E1 and the reactor L to the second DC power source E2 so as to charge the second DC power source E2 with energy. The eighth switching element S8 is turned on for synchronous rectification. Even if the eighth switching element S8 is used for synchronous rectification, the direction of the reactor current IL is not reversed because the fifth switching element S5 is in an off state.

Figure 12E:
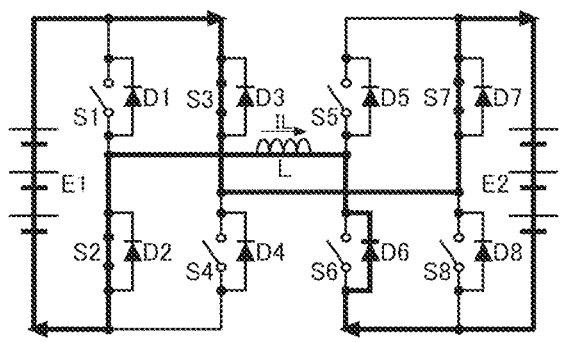
Figure 12C:
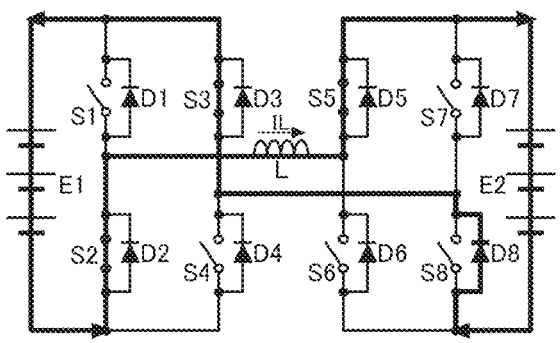
Figure 12D:
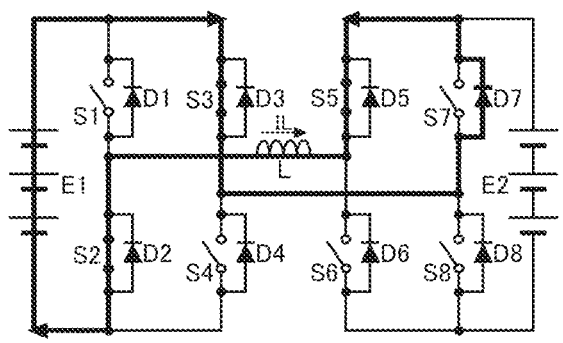

In the third state shown in FIG. 12C and in the fourth state shown in FIG. 12D, the control circuit 13 controls the second switching element S2, the third switching element S3, and the fifth switching element S5 to be in an on state and controls the first switching element S1, the fourth switching element S4, the sixth switching element S6, the seventh switching element S7, and the eighth switching element S8 to be in an off state. In the third state, energy is discharged from the reactor L to both of the first DC power source E1 and the second DC power source E2 so as to charge the first DC power source E1 and the second DC power source E2 with energy. In the fourth state, energy is discharged from the first DC power source E1 to the reactor L so as to charge the reactor L with energy. In the fourth state, the ends of the secondary winding n2 of the insulated transformer TR1 are short-circuited in the second bridge circuit 12, and the reactor L is electrically cut off from the second DC power source E2. When the reactor current IL goes to 0 A before a transition is made to the switching patterns shown in FIG. 12C and FIG. 12D, a transition is not made from the state 2 to the state 3, and a transition is directly made from the state 2 to the state 4.

In the fifth state shown in FIG. 12E, the control circuit 13 controls the second switching element S2, the third switching element S3, and the seventh switching element S7 to be in an on state and controls the first switching element S1, the fourth switching element S4, the fifth switching element S5, the sixth switching element S6, and the eighth switching element S8 to be in an off state. In the fifth state, energy is discharged from both of the first DC power source E1 and the reactor L to the second DC power source E2 so as to charge the second DC power source E2 with energy. The seventh switching element S7 is turned on for synchronous rectification. Even if the seventh switching element S7 is used for synchronous rectification, the direction of the reactor current IL is not reversed because the sixth switching element S6 is in an off state.

In the sixth state shown in FIG. 12F and in the first state shown in FIG. 12A, the control circuit 13 controls the first switching element S1, the fourth switching element S4, and the sixth switching element S6 to be in an on state and controls the second switching element S2, the third switching element S3, the fifth switching element S5, the seventh switching element S7, and the eighth switching element S8 to be in an off state. In the sixth state, energy is discharged from the reactor L to both of the first DC power source E1 and the second DC power source E2 so as to charge the first DC power source E1 and the second DC power source E2 with energy. When the reactor current IL goes to 0 A before a transition is made to the switching patterns shown in FIG. 12F and FIG. 12A, a transition is not made from the state 5 to the state 6, and a transition is directly made from the state 5 to the state 1.

In embodiment 1 (step-up mode), power is transferred from the first DC power source E1 to the second DC power source E2 by stepping up the voltage by repeating the four switching patterns above. In embodiment 1 (step-up mode), the voltage or current of the power supplied from the first DC part to the second DC part is controlled according to a duty ratio (on period) of the fifth switching element S5—the eighth switching element S8 on the secondary side. Any one or more of the fifth switching element S5—the eighth switching element S8 may be used as the switching element subject to duty ratio (on period) control. The duty ratio of the first switching element S1—the fourth switching element S4 on the primary side is fixed at 50%. The phase difference 0 between the first leg (the first switching element S1 and the second switching element S2) and the second leg (third switching element S3 and the fourth switching element $4) is fixed to be 0 or equal to or less than the dead time.

Figure 13:
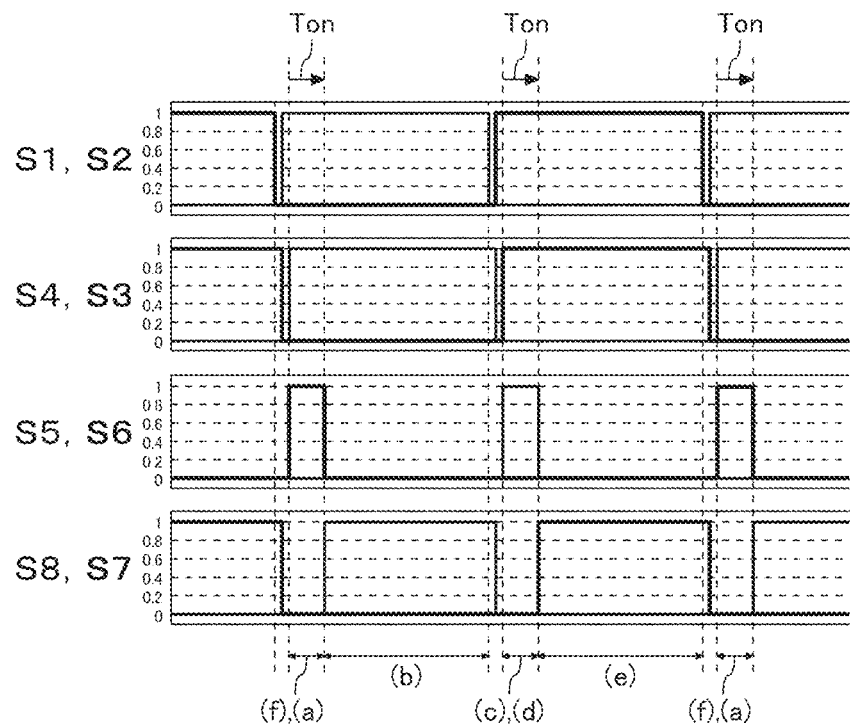
FIG. 13 shows a switching timing 1 of the first switching element S1—the eighth switching element S8 according to embodiment 1 (step-up mode)

FIG. 13 shows a switching timing 1 of the first switching element S1—the eighth switching element S8 according to embodiment 1 (step-up mode). The first switching element S1 and the second switching element S2 operate in a complementary manner. A dead time is inserted at a point of time when the on/off of the elements is switched. Similarly, the third switching element S3 and the fourth switching element S4 operate in a complementary manner. A dead time is inserted at a point of time when the on/off of the elements is switched. The step-up rate is determined according to the on period Ton of the fifth switching element S5 and the sixth switching element S6.

In the example shown in FIGS. 12A-12F and FIG. 13, the sixth switching element S6 is controlled to be in an on state in the state 6 (f) and the state 1 (a), and the eighth switching element S8 is controlled to be in an on state in the state 2 (b). Alternatively, the seventh switching element S7 may be controlled to be in an on state in the state 6 (f) and the state 1 (a), and the fifth switching element S5 may be controlled to be in an on state in the state 2 (b). Similarly, the fifth switching element S5 is controlled to be in an on state in the state 3 (c) and the state 4 (d), and the seventh switching element S7 is controlled to be in an on state in the state 5 (e). Alternatively, the eighth switching element S8 may be controlled to be in an on state in the state 3 (c) and the state 4 (d), and the sixth switching element S6 may be controlled to be in an on state in the state 5 (e).

Figure 14:
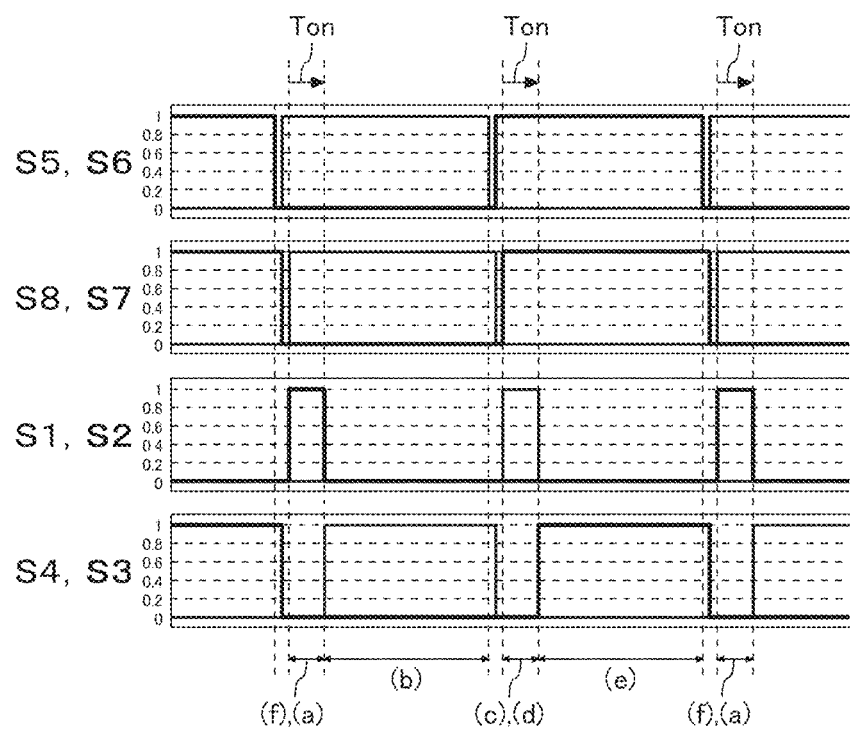
FIG. 14 shows a switching timing 2 of the first switching element S1—the eighth switching element S8 according to embodiment 1 (step-up mode)

FIG. 14 shows a switching timing 2 of the first switching element S1—the eighth switching element S8 according to embodiment 1 (step-up mode). In the example shown in FIGS. 12A-12F and FIG. 13, it is described that power is supplied from the first DC part to the second DC part by stepping up the voltage. Alternatively, power may be supplied from the second DC part to the first DC part by stepping up the voltage. In this case, as shown in FIG. 14, the control circuit 13 may switch the driving signal supplied to the first switching element S1—the fourth switching element S4 and the driving signal supplied to the fifth switching element S5—the eighth switching element S8.

As described above, embodiment 1 (step-up mode) can reduce reactive power and improve the conversion efficiency because it does not create a state in which power is transferred from the second DC power source E2 to the reactor L. In contrast, power is transferred from the second DC power source E2 to the reactor L in the states shown in FIGS. 2A, FIG. 2D according to comparative example 1 and in FIGS. 4A, FIG. 4D according to comparative example 2. This produces reactive power and conduction loss. According to embodiment 1 (step-up mode), power is prevented from being transferred from the second DC power source E2 to the reactor L, and conduction loss from a reactive current can be reduced, by providing a mode in which the secondary side is short-circuited when the reactor L is charged with energy.

Further, synchronous rectification on the secondary side in the state 2 (b) and the state 5 (e) can reduce conduction loss of the diode. By using one switching element used for synchronous rectification in the state 2 (b) and the state 5 (e), the direction of the reactor current IL is prevented from being reversed, and, at the same time, loss can be reduced. This can also prevent the occurrence of hard switching.

(Embodiment 2 (Step-Up Mode))

FIGS. 15A-15E show an operation 1 of the power converter 1 according to embodiment 2 (step-up mode). FIGS. 16A-16E show an operation 2 of the power converter 1 according to embodiment 2 (step-up mode). Embodiment 2 (step-up mode) is based on embodiment 1 (step-up mode) but is configured to make transitions in finer steps.

Figure 15A:
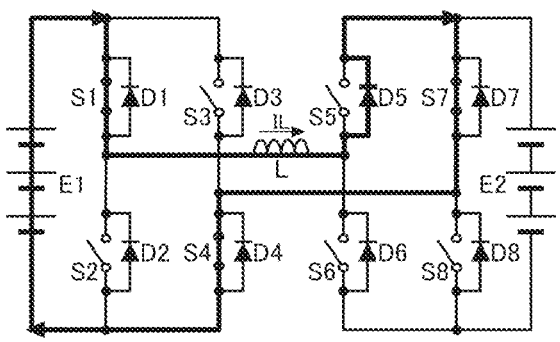
FIGS. 15A-15E show an operation 1 of the power converter according to embodiment 2 (step-up mode)

In the first state shown in FIG. 15A, the control circuit 13 controls the first switching element S1, the fourth switching element S4, and the seventh switching element S7 to be in an on state and controls the second switching element S2, the third switching element S3, the fifth switching element S5, the sixth switching element S6, and the eighth switching element S8 to be in an off state. In the first state, the ends of the secondary winding n2 of the insulated transformer TR1 are short-circuited in the second bridge circuit 12, and the reactor L is electrically cut off from the second DC power source E2. In the first state, energy is discharged from the first DC power source E1 to the reactor L so as to charge the reactor L with energy. This state corresponds to the first state of embodiment 1 (step-up mode) shown in FIG. 12A.

Figure 15D:
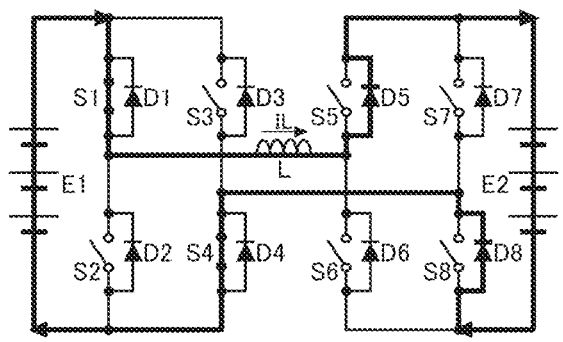
Figure 15B:
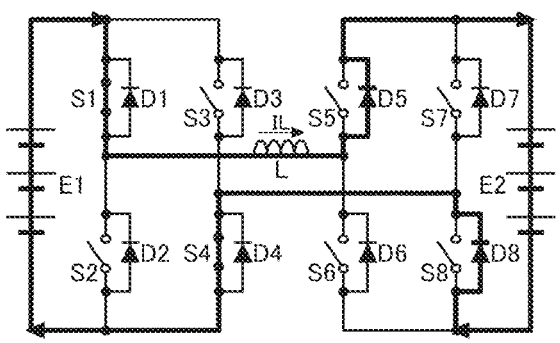

In the second state shown in FIG. 15B, the control circuit 13 controls the first switching element S1 and the fourth switching element S4 to be in an on state and controls the second switching element S2, the third switching element S3, the fifth switching element S5, the sixth switching element S6, the seventh switching element S7, and the eighth switching element S8 to be in an off state. In the second state, energy is discharged from both of the first DC power source E1 and the reactor L to the second DC power source E2 so as to charge the second DC power source E2 with energy.

Figure 15E:
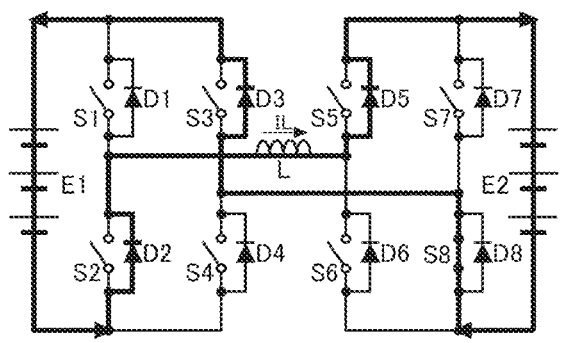
Figure 15C:
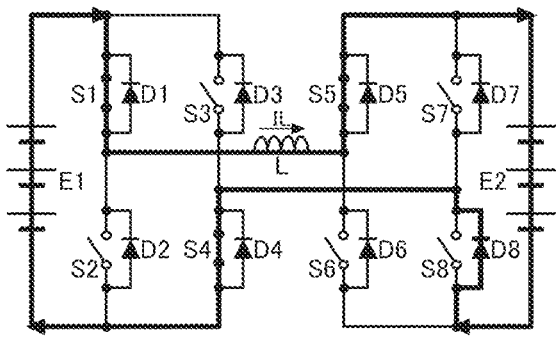

In the third state shown in FIG. 15C, the control circuit 13 controls the first switching element S1, the fourth switching element S4, and the fifth switching element S5 to be in an on state and controls the second switching element S2, the third switching element S3, the sixth switching element S6, the seventh switching element S7, and the eighth switching element S8 to be in an off state. In the third state, too, energy is discharged from both of the first DC power source E1 and the reactor L to the second DC power source E2 so as to charge the second DC power source E2 with energy. The fifth switching element S5 is turned on for synchronous rectification. This state corresponds to the second state of embodiment 1 (step-up mode) shown in FIG. 12B.

In the fourth state shown in FIG. 15D, the control circuit 13 controls the first switching element S1 and the fourth switching element S4 to be in an on state and controls the second switching element S2, the third switching element S3, the fifth switching element S5, the sixth switching element S6, the seventh switching element S7, and the eighth switching element S8 to be in an off state. In the fourth state, too, energy is discharged from both of the first DC power source E1 and the reactor L to the second DC power source E2 so as to charge the second DC power source E2 with energy.

In the fifth state shown in FIG. 15E, the control circuit 13 controls the eighth switching element S8 to be in an on state and controls the first switching element S1, the second switching element S2, the third switching element S3, the fourth switching element S4, the fifth switching element S5, the sixth switching element S6, and the seventh switching element S7 to be in an off state. In the fifth state, energy is discharged from the reactor L to both of the first DC power source E1 and the second DC power source E2 so as to charge the first DC power source E1 and the second DC power source E2 with energy.

Figure 16A:
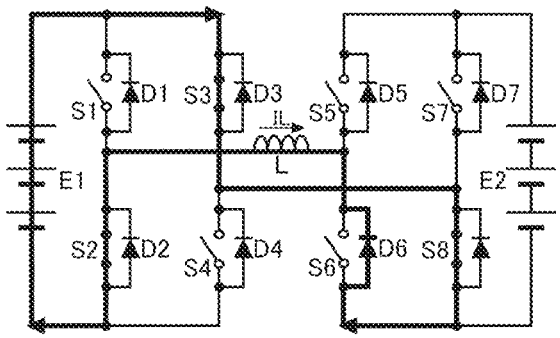
FIGS. 16A-16E show an operation 2 of the power converter according to embodiment 2 (step-up mode)

In the sixth state shown in FIG. 16A, the control circuit 13 controls the second switching element S2, the third switching element S3, and the eighth switching element S8 to be in an on state and controls the first switching element S1, the fourth switching element S4, the fifth switching element S5, the sixth switching element S6, and the seventh switching element S7 to be in an off state. In the sixth state, the ends of the secondary winding n2 of the insulated transformer TR1 are short-circuited in the second bridge circuit 12, and the reactor L is electrically cut off from the second DC power source E2. In the sixth state, energy is discharged from the first DC power source E1 to the reactor L so as to charge the reactor L with energy. This state corresponds to the fourth state of embodiment 1 (step-up mode) shown in FIG. 12D.

Figure 16D:
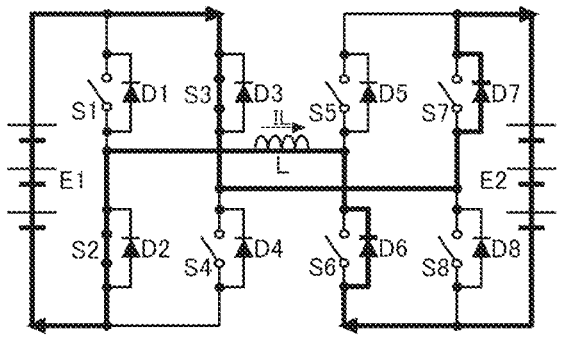
Figure 16B:
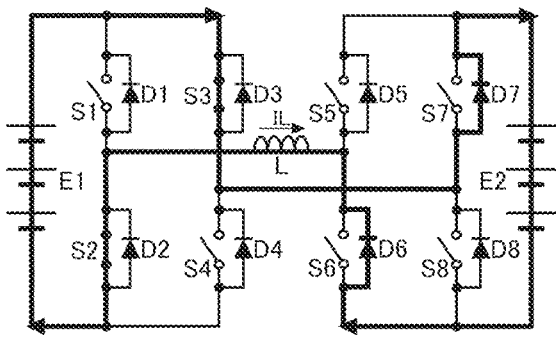

In the seventh state shown in FIG. 16B, the control circuit 13 controls the second switching element S2 and the third switching element S3 to be in an on state and controls the first switching element S1, the fourth switching element S4, the fifth switching element S5, the sixth switching element S6, the seventh switching element S7, and the eighth switching element S8 to be in an off state. In the seventh state, energy is discharged from both of the first DC power source E1 and the reactor L to the second DC power source E2 so as to charge the second DC power source E2 with energy.

Figure 16E:
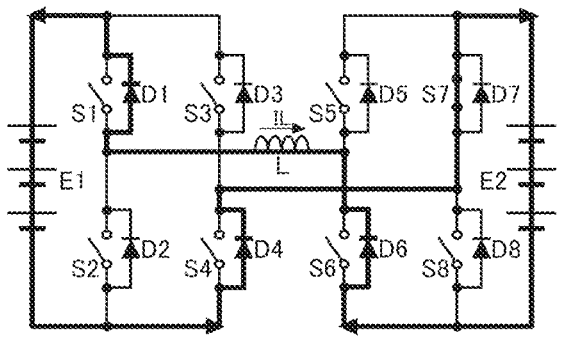
Figure 16C:
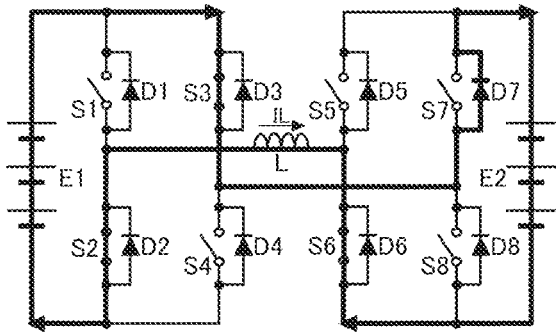

In the eighth state shown in FIG. 16C, the control circuit 13 controls the second switching element S2, the third switching element S3, and the sixth switching element S6 to be in an on state and controls the first switching element S1, the fourth switching element S4, the fifth switching element S5, the seventh switching element S7, and the eighth switching element S8 to be in an off state. In the eighth state, too, energy is discharged from both of the first DC power source E1 and the reactor L to the second DC power source E2 so as to charge the second DC power source E2 with energy. The sixth switching element S6 is turned on for synchronous rectification. This state corresponds to the fifth state of embodiment 1 (step-up mode) shown in FIG. 12E.

In the ninth state shown in FIG. 16D, the control circuit 13 controls the second switching element S2 and the third switching element S3 to be in an on state and controls the first switching element S1, the fourth switching element S4, the fifth switching element S5, the sixth switching element S6, the seventh switching element S7, and the eighth switching element S8 to be in an off state. In the ninth state, too, energy is discharged from both of the first DC power source E1 and the reactor L to the second DC power source E2 so as to charge the second DC power source E2 with energy.

In the tenth state shown in FIG. 16E, the control circuit 13 controls the seventh switching element S7 to be in an on state and controls the first switching element S1, the second switching element S2, the third switching element S3, the fourth switching element S4, the fifth switching element S5, the sixth switching element S6, and the eighth switching element S8 to be in an off state. In the tenth state, energy is discharged from the reactor L to both of the first DC power source E1 and the second DC power source E2 so as to charge the first DC power source E1 and the second DC power source E2 with energy.

In embodiment 2 (step-up mode), power is transferred from the first DC power source E1 to the second DC power source E2 by stepping up the voltage by repeating the ten switching patterns above. In embodiment 2 (step-up mode), the voltage or current of the power supplied from the first DC part to the second DC part is controlled according to a duty ratio (on period) of the eighth switching element S8 and the seventh switching element S7 on the secondary side. The duty ratio of the first switching element S1—the fourth switching element S4 on the primary side is fixed at 50%. 50% is a value that does not allow for a dead time. The phase difference 0 between the first leg and the second leg on the primary side is fixed at 0.

Figure 17:
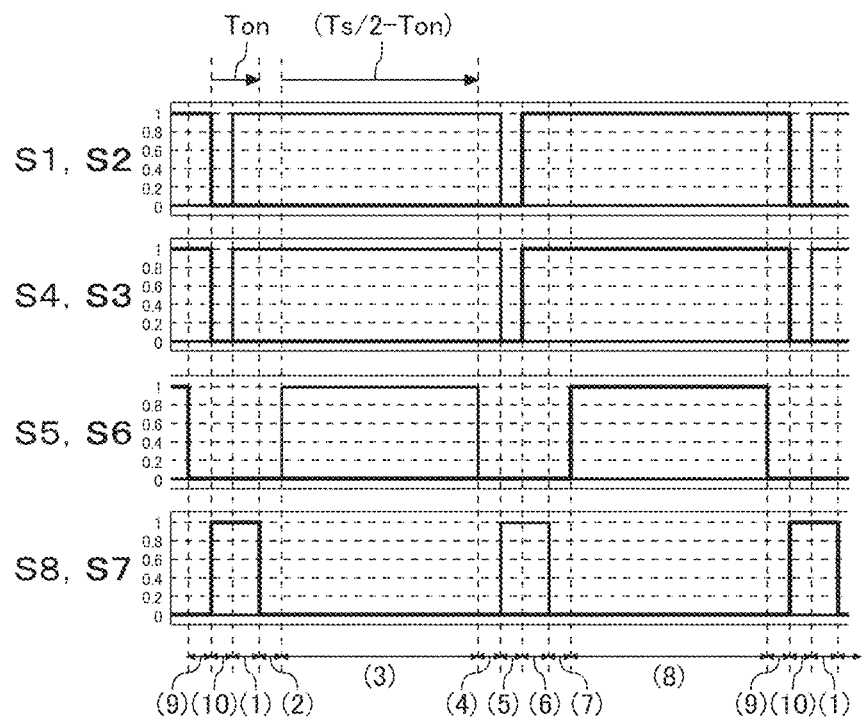
FIG. 17 shows a switching timing of the first switching element S1—the eighth switching element S8 according to embodiment 2 (step-up mode)

FIG. 17 shows a switching timing of the first switching element S1—the eighth switching element S8 according to embodiment 2 (step-up mode). Thin lines show on/off states of the first switching element S1, the fourth switching element S4, the fifth switching element S5, and the eighth switching element S8. Bold lines show on/off states of the second switching element S2, the third switching element S3, the sixth switching element S6, and the seventh switching element S7.

The first switching element S1 and the second switching element S2 operate in a complementary manner. A dead time is inserted at a point of time when the on/off of the elements is switched. Similarly, the third switching element S3 and the fourth switching element S4 operate in a complementary manner. A dead time is inserted at a point of time when the on/off of the elements is switched. The step-up rate is determined according to the on period Ton of the eighth switching element S8 and the seventh switching element S7.

The on period Ton of the eighth switching element S8 and the seventh switching element S7 is controlled according to the duty. The rising phase of the eighth switching element S8 and the seventh switching element S7 is fixed, and the falling phase thereof is variable.

The rising phase of the eighth switching element S8 is controlled to be synchronized with the falling phase of the first switching element S1. More specifically, the eighth switching element S8 is turned on at the same time as the first switching element S1 is turned off. The rising phase of the seventh switching element S7 is controlled to be synchronized with the falling phase of the second switching element S2. More specifically, the seventh switching element S7 is turned on at the same time as the second switching element S2 is turned off. This facilitates ZVS of the eighth switching element S8 or the seventh switching element S7.

The on period of the fifth switching element S5 and the sixth switching element S6 is controlled to be of an amount derived from subtracting an amount of shift corresponding to the on period Ton of the eighth switching element S8 and the seventh switching element S7 from the half cycle (Ts/2) of the unit period on the primary side. The rising phase of the fifth switching element S5 and the sixth switching element S6 is variable, and the falling phase thereof is fixed.

The rising phase of the fifth switching element S5 is controlled to be delayed from the rising phase of the first switching element S1 by a dead time or later. More specifically, the fifth switching element S5 is turned on when a dead time elapses since the turn-on of the first switching element S1 or later. The rising phase of the sixth switching element S6 is controlled to be delayed from the rising phase of the second switching element S2 by a dead time or later. More specifically, the sixth switching element S6 is turned on when a dead time elapses since the turn-on of the second switching element S2 or later. This can reduce the occurrence of recovery loss.

The earliest rising phase of the fifth switching element S5 is delayed from the rising phase of the first switching element S1 by a dead time. The fifth switching element S5 does not rise earlier. Similarly, the earliest rising phase of the sixth switching element S6 is delayed from the rising phase of the second switching element S2 by a dead time. The sixth switching element S6 does not rise earlier.

The falling phase of the fifth switching element S5 is controlled to be earlier than the falling phase of the first switching element S1 by a dead time. More specifically, the fifth switching element S5 is turned off earlier than the turn-off of the first switching element S1 by a dead time. This can reduce the occurrence of a reactive current from the secondary side due to the simultaneous turn-on of the fifth switching element S5 and the eighth switching element S8. The falling phase of the sixth switching element S6 is controlled to be earlier than the falling phase of the second switching element S2 by a dead time. More specifically, the sixth switching element S6 is turned off earlier than the turn-off of the second switching element S2 by a dead time. This can reduce the occurrence of a reactive current from the secondary side due to the simultaneous turn-on of the sixth switching element S6 and the seventh switching element S7.

The electrical energy transferred is controlled according to the on period Ton of the eighth switching element S8 and the seventh switching element S7. The longer the on period Ton, the larger the electrical energy transferred can be. Given that the dead time is fixed, loss incurred in high-frequency operation can be reduced by configuring the phase difference between the first leg and the second leg on the primary side to be 0.

As in embodiment 1 (step-up mode), control of the fifth switching element S5 and control of the eighth switching element S8 may be switched, and control of the sixth switching element S6 and control of the seventh switching element S7 may be switched in embodiment 2 (step-up mode). It is also possible to supply power from the second DC part to the first DC part by stepping up the voltage in embodiment 2 (step-up mode), too, by switching the driving signal supplied to the first switching element S1—the fourth switching element S4 and the driving signal supplied to the fifth switching element S5—the eighth switching element S8.

As described above, embodiment 2 (step-up mode) provides the same advantage as embodiment 1 (step-up mode). By performing finer control than embodiment 1 (step-up mode), the efficiency can be further increased.

In comparative example 2 described above, it is possible to switch between the step-down operation and the step-up operation by controlling the duty ratio (on period) of the fifth switching element S5—the eighth switching element S8 on the secondary side. In embodiments 1 and 2, on the other hand, the phase difference θ between the first leg and the second leg is controlled in the step-down mode, and the duty ratio (on period) of the fifth switching element S5—the eighth switching element S8 on the secondary side is controlled in the step-up mode.

For power transfer from the first DC part to the second DC part, the control circuit 13 switches between the step-down mode and the step-up mode based on the voltage of the first DC part and the voltage of the second DC part. When the voltage of the second DC part is lower than the voltage of the first DC part, the control circuit 13 selects the step-down mode. When the voltage of the second DC part is higher than the voltage of the first DC part, the control circuit 13 selects the step-up mode. Further, for power transfer from the second DC part to the first DC part, the control circuit 13 switches between the step-down mode and the step-up mode based on the voltage of the second DC part and the voltage of the first DC part. When the voltage of the first DC part is lower than the voltage of the second DC part, the control circuit 13 selects the step-down mode. When the voltage of the first DC part is higher than the voltage of the second DC part, the control circuit 13 selects the step-up mode. The control circuit 13 may switch between the step-down mode and the step-up mode based on the direction of the current flowing in the first DC part, the direction of the current flowing in the second DC part, or the direction of the reactor current IL.

Figure 18:
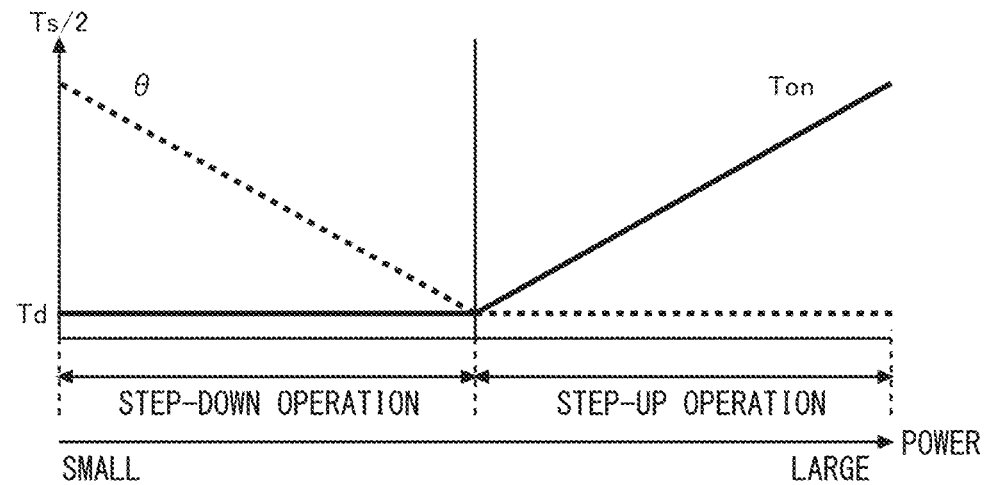
FIG. 18 shows switching between the step-down operation and the step-up operation of the power converter according to embodiments 1, 2.

FIG. 18 shows switching between the step-down operation and the step-up operation of the power converter 1 according to embodiments 1, 2. In the step-down operation, the on period Ton of the fifth switching element S5—the eighth switching element S8 on the secondary side is fixed to be equal to or less than a dead time Td (which could be 0), and the phase difference θ between the first leg and the second leg on the primary side is controlled. In the step-up operation, the phase difference θ between the first leg and the second leg on the primary side is fixed to be equal to or less than the dead time Td (which could be 0), and the on period Ton of the fifth switching element S5—the eighth switching element S8 on the secondary side is controlled.

The maximum value of the phase difference θ and the maximum value of the on period are both the half cycle (Ts/2). Since the phase difference θ/the on period Ton used when the maximum power is output in the step-down operation and the phase difference θ/on period Ton used when the maximum power is output in the step-up operation are equal, seamless switching between the step-down operation and the step-up operation is possible.

As described above, the combination of the step-down mode and the step-up mode according to embodiments 1, 2 makes it possible to use one DC-DC converter to perform the step-down operation and the step-up operation and transfer power bidirectionally. Accordingly, the converter can be compatible with an extensive voltage range both on the primary side and the secondary side.

Described above is an explanation of the present disclosure based on the embodiment. The embodiment is intended to be illustrative only and it will be understood by those skilled in the art that various modifications to constituting elements and processes could be developed and that such modifications are also within the scope of the present disclosure.

In embodiment 1 (step-down mode), the eighth switching element S8 is controlled to be in an on state in the state 2 (*b*), and the seventh switching element S7 is controlled to be in an on state in the state 5 (*e*), as shown in FIGS. 6A-6F, for synchronous rectification. Alternatively, synchronous rectification in the state 2 (*b*) and the state 5 (*e*) may be omitted. More specifically, the fifth switching element S5—the eighth switching element S8 may all be controlled to be in an off state in the state 2 (*b*) and the state 5 (*e*).

In embodiment 1 (step-up mode), the eighth switching element S8 is controlled to be in an on state in the state 2 (*b*), and the seventh switching element S7 is controlled to be in an on state in the state 5 (*e*), as shown in FIGS. 12A-12F, for synchronous rectification. Alternatively, synchronous rectification in the state 2 (*b*) and the state 5 (*e*) may be omitted. More specifically, the fifth switching element S5—the eighth switching element S8 may all be controlled to be in an off state in the state 2 (*b*) and the state 5 (*e*).

Figure 19:
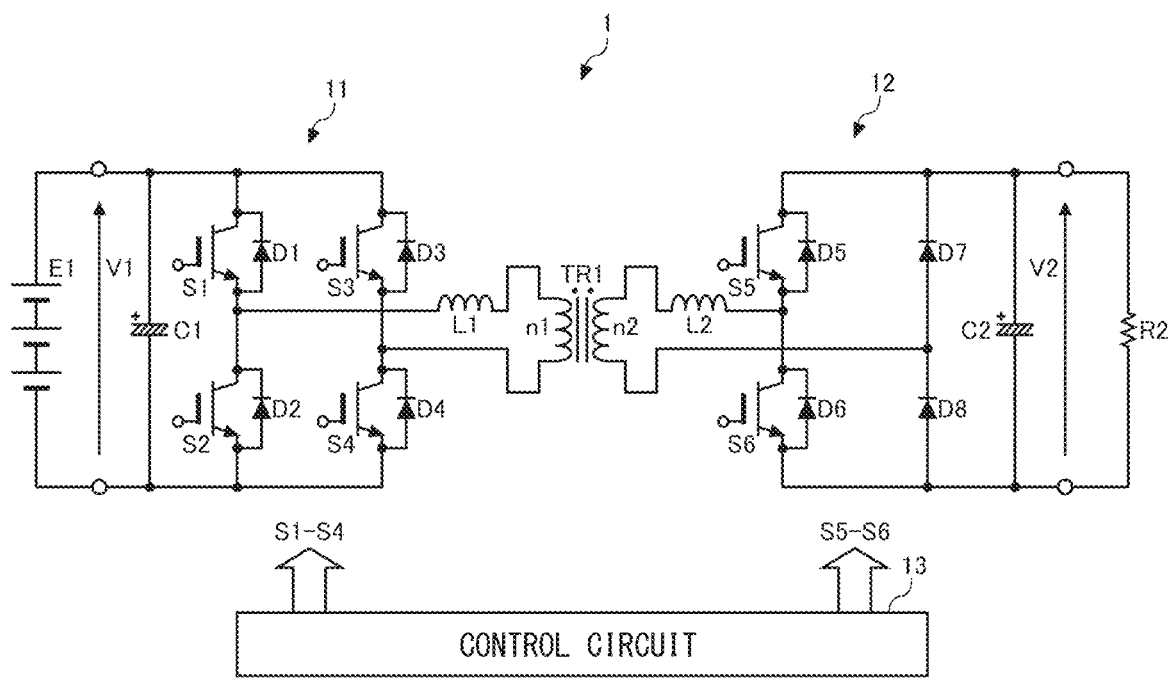
FIG. 19 shows a configuration of the power converter according to a variation.

FIG. 19 shows a configuration of the power converter 1 according to a variation. The power converter 1 according to the variation is an insulated unidirectional DC-DC converter. It can be used in applications in which the first DC power source 1 on the primary side is not charged by the load R2 on the secondary side. In the power converter 1 according to the variation, two diode devices (the seventh diode D7 and the eighth diode D8) are used in place of the seventh switching element S7 and the eighth switching element S8 in the second bridge circuit 12.

When synchronous rectification is omitted in the state 2 (*b*) and the state 5 (*e*) in the step-up mode shown in FIGS. 12A-12F and FIG. 13, the seventh switching element S7 and the eighth switching element S8 are in a continuous off state. In this case, the step-up operation is equally possible in the power converter 1 according to the variation by performing the same control as performed in embodiment 1. By omitting synchronous rectification in the state 2 (*b*) and the state 5 (*e*) in the step-down mode shown in FIGS. 6A-6F and FIG. 7, the step-down operation is equally possible in the power converter 1 according to the variation by performing the same control as performed in embodiment 1. According to the variation, the cost of the second bridge circuit 12 can be reduced.

The embodiments may be defined by the following items.

[Item 1]

1. A power converter (1) including:
    a first bridge circuit (11) including a first leg and a second leg, the first leg including a first switching element (S1) and a second switching element (S2) connected in series, the second leg including a third switching element (S3) and a fourth switching element (S4) connected in series, and the first leg and the second leg being connected in parallel to a first DC part (E1, C1);
    a second bridge circuit (12) including a third leg and a fourth leg, the third leg including a fifth switching element (S5) and a sixth switching element (S6) connected in series, the fourth leg including a seventh switching element (S7) and an eighth switching element (S8) connected in series, and the third leg and the fourth leg being connected in parallel to a second DC part (C2, E2);
    an insulated transformer (TR1) connected between the first bridge circuit (11) and the second bridge circuit (12);
    a control circuit (13) that controls the first switching element (S1)—the eighth switching element (S8), wherein diodes (D1-D8) are connected or formed in antiparallel to the first switching element (S1)—the eighth switching element (S8), respectively, and, for power transfer from the first DC part (E1, C1) to the second DC part (C2, E2) by stepping up a voltage, the second bridge circuit (12) includes a period in which a secondary winding (n2) of the insulated transformer (TR1) and the second DC part (C2, E2) conduct and a period in which ends of the secondary winding (n2) of the insulated transformer (TR1) are short-circuited in the second bridge circuit (12), the control circuit (13)

fixes a phase difference between the first leg and the second leg, variably controls a simultaneous off period of the fifth switching element (S5) and the sixth switching element (S6), and variably controls a simultaneous off period of the seventh switching element (S7) and the eighth switching element (S8).

This realizes a highly efficient DC-DC converter of step-up type in which a reactive current is reduced.

[Item 2]

The power converter (1) according to item 1, wherein the control circuit (13) performs control that includes:

a first pattern in which the first switching element (S1) and the fourth switching element (S4) are in an on state, the second switching element (S2) and the third switching element (S3) are in an off state, and ends of the secondary winding (n2) of the insulated transformer (TR1) are short-circuited in the second bridge circuit (12);

a second pattern in which the first switching element (S1) and the fourth switching element (S4) are in an on state, the second switching element (S2) and the third switching element (S3) are in an off state, and the second bridge circuit (12) is in a rectification state;

a third pattern in which the second switching element (S2) and the third switching element (S3) are in an on state, the first switching element (S1) and the fourth switching element (S4) are in an off state, and the ends of the secondary winding (n2) of the insulated transformer (TR1) are short-circuited in the second bridge circuit (12); and a fourth pattern in which the second switching element (S2) and the third switching element (S3) are in an on state, the first switching element (S1) and the fourth switching element (S4) are in an off state, and the second bridge circuit (12) is in a rectification state.

This realizes a highly efficient DC-DC converter of step-up type in which a reactive current is reduced.

[Item 3]

The power converter (1) according to item 2, wherein the control circuit (13)

controls the fifth switching element (S5) to be in an on state in the third pattern when the sixth switching element (S6) is controlled to be in an on state in the first pattern, and controls the eighth switching element (S8) to be in an on state in the third pattern when the seventh switching element (S7) is controlled to be in an on state in the first pattern.

This makes it possible to use the upper switching elements (S5, S7) and the lower switching elements (S6, S8) alternately to short-circuit the secondary side so that the heat is prevented from being concentrated in the upper or lower switching elements.

[Item 4]

The power converter (1) according to item 2 or 3, wherein the control circuit (13)

controls the eighth switching element (S8) or the fifth switching element (S5) to be in an on state in the second pattern, and controls the seventh switching element (S7) or the sixth switching element (S6) in an on state in the fourth pattern.

This can reduce conduction loss of the diode by performing synchronous rectification.

[Item 5]

The power converter (1) according to item 3, wherein the control circuit (13) fixes the phase difference between the first leg and the second leg and controls a voltage or current of power supplied from the first DC part (E1, C1) to the second DC part (C2, E2) according to at least one of an on period of the sixth switching element (S6) or the seventh switching element (S7) in the first pattern or an on period of the fifth switching element (S5) or the eighth switching element (S8) in the third pattern.

This makes it possible to control the voltage or current by controlling the secondary side without controlling the primary side.

[Item 6]

The power converter (1) according to item 5, wherein the control circuit (13) sets the phase difference to 0.

This can reduce loss incurred in high-frequency operation.

[Item 7]

The power converter (1) according to any one of items 1 through 6, wherein the control circuit (13)

turns on the sixth switching element (S6) or the seventh switching element (S7) in synchronization with turn-off of the second switching element (S2), and turns on the fifth switching element (S5) or the eighth switching element (S8) in synchronization with turn-off of the first switching element (S1).

This facilitates ZVS operation.

[Item 8]

The power converter (1) according to item 7, wherein the control circuit (13)

turns on the eighth switching element (S8) or the fifth switching element (S5) when a dead time elapses since turn-on of the first switching element (S) or later, and turns on the seventh switching element (S7) or the sixth switching element (S6) when a dead time elapses since turn-on of the second switching element (S2) or later.

This can reduce the occurrence of recovery loss.

[Item 9]

The power converter (1) according to item 7 or 8, wherein the control circuit (13)

turns off the eighth switching element (S8) or the fifth switching element (S5) earlier than turn-off of the first switching element (S1) by a dead time, and turns off the seventh switching element (S) or the sixth switching element (S6) earlier than turn-off of the second switching element (S2) by a dead time.

This can reduce the occurrence of a reactive current from the secondary side.

[Item 10]

The power converter (1) according to any one of items 1 through 9, wherein for power transfer from the second DC part (C2, E2) to the first DC part (E1, C1) by stepping up a voltage, the control circuit (13) switches a driving signal supplied to the first switching element (S1)—the fourth switching element (S4) and a driving signal supplied to the fifth switching element (S5)—the eighth switching element (S8).

This realizes a highly efficient bidirectional DC-DC converter of step-up type in which a reactive current is reduced.

[Item 11]

A power converter (1) including:
a first bridge circuit (11) including a first leg and a second leg, the first leg including a first switching element (S1) and a second switching element (S2) connected in series, the second leg including a third switching element (S3) and a fourth switching element (S4) connected in series, and the first leg and the second leg being connected in parallel to a first DC part (E1, C1);
a second bridge circuit (12) including a third leg and a fourth leg, the third leg including a fifth switching element (S5) and a sixth switching element (S6) connected in series, the fourth leg including a seventh diode (D7) and an eighth diode (D8) connected in series, and the third leg and the fourth leg being connected in parallel to a second DC part (C2, R2);
an insulated transformer (TR1) connected between the first bridge circuit (11) and the second bridge circuit (12);
a control circuit (13) that controls the first switching element (S1)—the sixth switching element (S6), wherein
diodes (D1-D6) are connected or formed in antiparallel to the first switching element (S1)—the sixth switching element (S6), respectively,
the seventh diode (S7) and the eighth diode (S8) are connected in a direction opposite to that of the second DC part (C2, R2), and,
for power transfer from the first DC part (E1, C1) to the second DC part (C2, R2) by stepping up a voltage,
the second bridge circuit (12) includes a period in which a secondary winding (n2) of the insulated transformer (TR1) and the second DC part (C2, E2) conduct and a period in which ends of the secondary winding (n2) of the insulated transformer (TR1) are short-circuited in the second bridge circuit (12),
the control circuit (13)
fixes a phase difference between the first leg and the second leg, and
variably controls a simultaneous off period of the fifth switching element (S5) and the sixth switching element (S6).

This realizes a highly efficient unidirectional DC-DC converter of step-up type in which the cost is reduced.

INDUSTRIAL APPLICABILITY

The present disclosure is applicable to DAB converters.

REFERENCE SIGNS LIST

E1 first DC power source, E2 second DC power source, 1 power converter, 11 first bridge circuit, 12 second bridge circuit, 13 control circuit, S1-S8 switching elements, D1-D8 diodes, L reactor, TR1 insulated transformer, n1 primary winding, n2 secondary winding, L1 first leak inductance, L2 second leak inductance, C1 first capacitor, C2 second capacitor, R2 load

The invention claimed is:

1. A power converter comprising:
a first bridge circuit including a first leg and a second leg, the first leg including a first switching element and a second switching element connected in series, the second leg including a third switching element and a fourth switching element connected in series, and the first leg and the second leg being connected in parallel to a first DC part;
a second bridge circuit including a third leg and a fourth leg, the third leg including a fifth switching element and a sixth switching element connected in series, the fourth leg including a seventh switching element and an eighth switching element connected in series, and the third leg and the fourth leg being connected in parallel to a second DC part;
an insulated transformer connected between the first bridge circuit and the second bridge circuit; and
a control circuit that controls the first switching element to the eighth switching element, wherein
diodes are connected or formed in antiparallel to the first switching element to the eighth switching element, respectively,
for power transfer from the first DC part to the second DC part by stepping up a voltage, the second bridge circuit includes a period in which a secondary winding of the insulated transformer and the second DC part conduct and a period in which ends of the secondary winding of the insulated transformer are short-circuited in the second bridge circuit,
the control circuit
fixes a phase difference between the first leg and the second leg,
variably controls a simultaneous off period of the fifth switching element and the sixth switching element, and
variably controls a simultaneous off period of the seventh switching element and the eighth switching element, and
for power transfer from the first DC part to the second DC part by stepping down a voltage,
the control circuit performs control that includes:
a first pattern in which the first switching element and the fourth switching element are in an on state, the second switching element and the third switching element are in an off state, and the ends of the secondary winding of the insulated transformer are short-circuited in the second bridge circuit;
a second pattern in which the first switching element and the fourth switching element are in an on state, the second switching element and the third switching element are in an off state, and the second bridge circuit is in a rectification state;
a third pattern in which the second switching element and the third switching element are in an on state, the first switching element and the fourth switching element are in an off state, and the ends of the secondary winding of the insulated transformer are short-circuited in the second bridge circuit; and
a fourth pattern in which the second switching element and the third switching element are in an on state, the first switching element and the fourth switching element are in an off state, and the second bridge circuit is in a rectification state.

2. The power converter according to claim 1, wherein the control circuit
controls the fifth switching element to be in an on state in the third pattern when the sixth switching element is controlled to be in an on state in the first pattern, and
controls the eighth switching element to be in an on state in the third pattern when the seventh switching element is controlled to be in an on state in the first pattern.

3. The power converter according to claim 1, wherein the control circuit
- controls the eighth switching element or the fifth switching element to be in an on state in the second pattern, and
- controls the seventh switching element or the sixth switching element in an on state in the fourth pattern.

4. The power converter according to claim 2, wherein the control circuit fixes the phase difference between the first leg and the second leg and controls a voltage or current of power supplied from the first DC part to the second DC part according to at least one of an on period of the sixth switching element or the seventh switching element in the first pattern or an on period of the fifth switching element or the eighth switching element in the third pattern.

5. The power converter according to claim 4, wherein the control circuit sets the phase difference to 0.

6. The power converter according to claim 1, wherein the control circuit
- turns on the sixth switching element or the seventh switching element in synchronization with turn-off of the second switching element, and
- turns on the fifth switching element or the eighth switching element in synchronization with turn-off of the first switching element.

7. The power converter according to claim 6, wherein the control circuit
- turns on the eighth switching element or the fifth switching element when a dead time elapses since turn-on of the first switching element or later, and
- turns on the seventh switching element or the sixth switching element when a dead time elapses since turn-on of the second switching element or later.

8. The power converter according to claim 6, wherein the control circuit
- turns off the eighth switching element or the fifth switching element earlier than turn-off of the first switching element by a dead time, and
- turns off the seventh switching element or the sixth switching element earlier than turn-off of the second switching element by a dead time.

9. The power converter according to claim 1, wherein, for power transfer from the second DC part to the first DC part by stepping up a voltage, the control circuit switches a driving signal supplied to the first switching element to the fourth switching element and a driving signal supplied to the fifth switching element to the eighth switching element.

10. A power converter comprising:
- a first bridge circuit including a first leg and a second leg, the first leg including a first switching element and a second switching element connected in series, the second leg including a third switching element and a fourth switching element connected in series, and the first leg and the second leg being connected in parallel to a first DC part;
- a second bridge circuit including a third leg and a fourth leg, the third leg including a fifth switching element and a sixth switching element connected in series, the fourth leg including a seventh diode and an eighth diode connected in series, and the third leg and the fourth leg being connected in parallel to a second DC part;
- an insulated transformer connected between the first bridge circuit and the second bridge circuit; and
- a control circuit that controls the first switching element to the sixth switching element, wherein
- diodes are connected or formed in antiparallel to the first switching element to the sixth switching element, respectively,
- the seventh diode and the eighth diode are connected in a direction opposite to that of the second DC part, and,
- for power transfer from the first DC part to the second DC part by stepping up a voltage, the second bridge circuit includes a period in which a secondary winding of the insulated transformer and the second DC part conduct and a period in which ends of the secondary winding of the insulated transformer are short-circuited in the second bridge circuit,
- the control circuit
- fixes a phase difference between the first leg and the second leg,
- variably controls a simultaneous off period of the fifth switching element and the sixth switching element, and
- for power transfer from the first DC part to the second DC part by stepping down a voltage, the control circuit performs control that includes:
  - a first pattern in which the first switching element and the fourth switching element are in an on state, the second switching element and the third switching element are in an off state, and the ends of the secondary winding of the insulated transformer are short-circuited in the second bridge circuit;
  - a second pattern in which the first switching element and the fourth switching element are in an on state, the second switching element and the third switching element are in an off state, and the second bridge circuit is in a rectification state;
  - a third pattern in which the second switching element and the third switching element are in an on state, the first switching element and the fourth switching element are in an off state, and the ends of the secondary winding of the insulated transformer are short-circuited in the second bridge circuit; and
  - a fourth pattern in which the second switching element and the third switching element are in an on state, the first switching element and the fourth switching element are in an off state, and the second bridge circuit is in a rectification state.

\* \* \* \* \*